(12) United States Patent
Kobayashi

(10) Patent No.: US 7,840,616 B2
(45) Date of Patent: Nov. 23, 2010

(54) FILE RECORDING METHOD, FILE RECORDING APPARATUS, AND PROGRAM

(75) Inventor: Hideaki Kobayashi, Hyogo (JP)

(73) Assignee: Panasonic Corporation, Osaka (JP)

( * ) Notice: Subject to any disclaimer, the term of this patent is extended or adjusted under 35 U.S.C. 154(b) by 777 days.

(21) Appl. No.: 11/481,543

(22) Filed: Jul. 6, 2006

(65) Prior Publication Data

US 2007/0008852 A1  Jan. 11, 2007

(30) Foreign Application Priority Data

Jul. 8, 2005   (JP)   ............... 2005-199655

(51) Int. Cl.
- G06F 3/06 (2006.01)
- G06F 7/00 (2006.01)
- G06F 12/00 (2006.01)
- G11B 20/10 (2006.01)

(52) U.S. Cl. ........................ 707/822; 711/170
(58) Field of Classification Search .................. 707/822
See application file for complete search history.

(56) References Cited

U.S. PATENT DOCUMENTS

| 5,926,826 A * | 7/1999 | Ninomiya et al. ........... 711/103 |
| 7,430,156 B2 * | 9/2008 | Yoshida et al. ............. 369/53.2 |
| 2006/0184717 A1 * | 8/2006 | Rothman et al. ........... 711/103 |

FOREIGN PATENT DOCUMENTS

JP   2004-79125   3/2004

OTHER PUBLICATIONS

Shmidt, TrueFFS Wear-Leveling Mechanism, May 20, 2002, pp. 1-4.*
Gal, Algorithms and Data Structures for Flash Memories, Jun. 2005, pp. 138-163.*
The PC Guide, Sparse File Support, Apr. 27, 2001, pp. 1-3.*
Thain, The Case for Sparse Files, Jan. 10, 2003, pp. 1-15.*
Gay, Advanced UNIX Programming, Sep. 20, 2000, pp. 1-4.*
Veritas File System System Administrators Guide, 1997, pp. 34-38.*
Video Capture in Liberty BASIC, 2004, pp. 1-4.*

* cited by examiner

*Primary Examiner*—James Trujillo
*Assistant Examiner*—Albert Phillips
(74) *Attorney, Agent, or Firm*—Hamre, Schumann, Mueller & Larson, P.C.

(57) ABSTRACT

The file recording method of the present invention is a method for recording a file on an information medium including at least both a specific area and a data area. In the method, a reserved area is allocated previously as a part of a recording file, from a current recording location of the recording file under recording on the data area, and at the same time, management information of the recording file including the reserved area is recorded on the specific area. When recording data additionally on the recording file, the data are recorded on the reserved area from the recording location. Thereby, the concentration of rewriting of the management information of a file system to a storage area is avoided while compatibility with an existing file system is maintained, and thus the life of the information medium is extended.

16 Claims, 15 Drawing Sheets

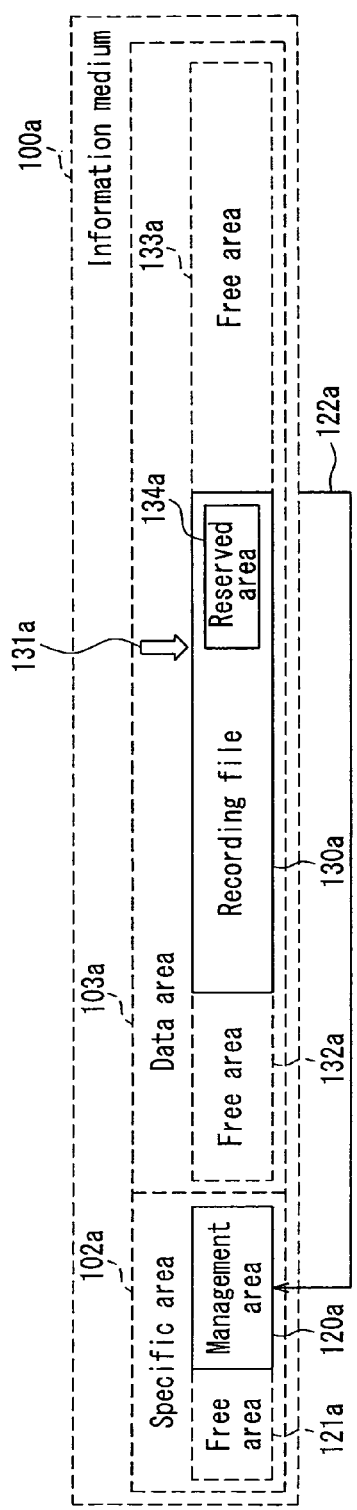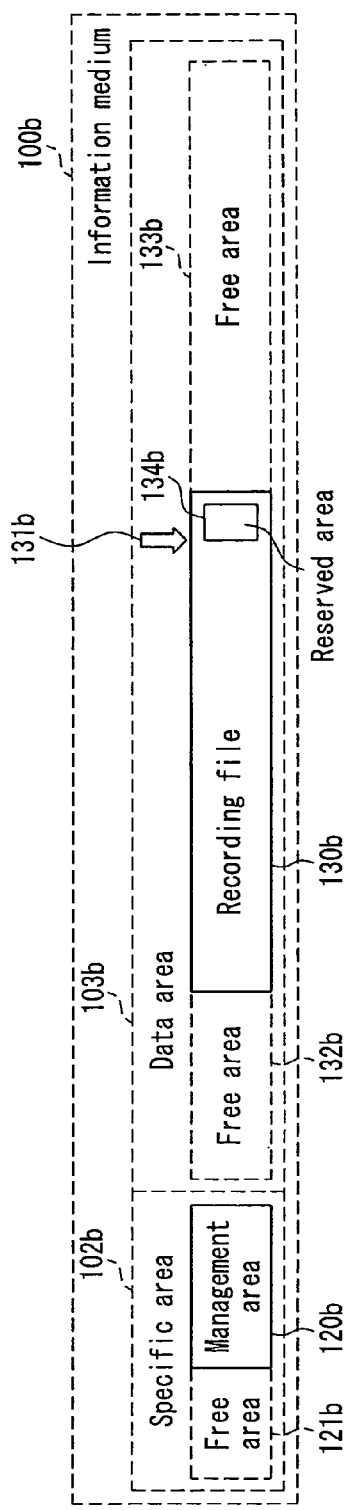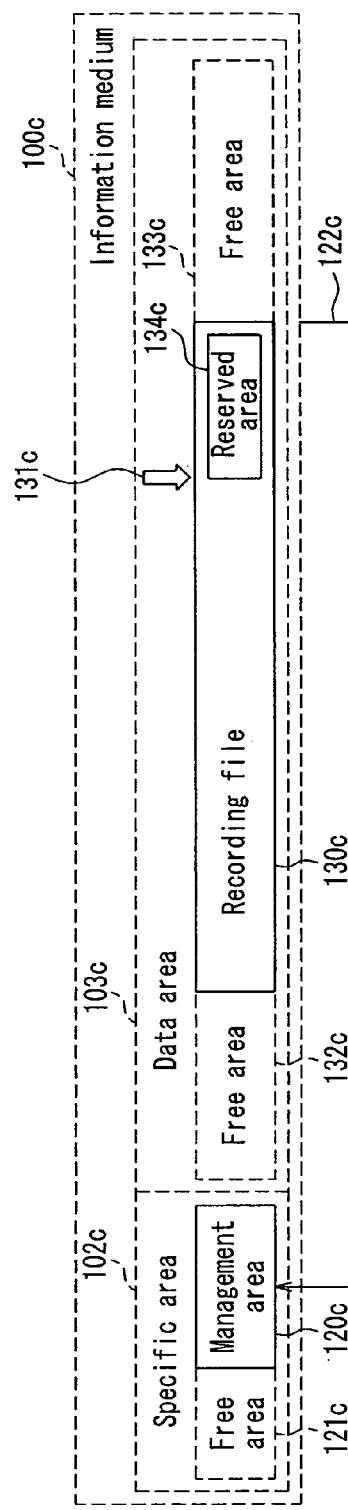

FILE RECORDING METHOD, FILE RECORDING APPARATUS, AND PROGRAM

BACKGROUND OF THE INVENTION

1. Field of the Invention

The present invention relates to a method, an apparatus and a program for recording a file on an information medium. More specifically, the present invention relates to a technique for extending the life of an information medium at a time of file recording by use of a file system.

2. Description of Related Art

In a recording apparatus used for recording information on an information medium such as a hard disk, an optical disk or a flash memory, the information is recorded in a recording area on the information medium. When the information becomes unnecessary, the information is deleted so that the area can be reused for recording other information. In such a recording apparatus, it is general to use a file system for facilitating information management. By using such a file system, recorded information can be managed as a file so as to construct a directory hierarchy. Examples of the file system include FAT (File Allocation Table) used for a personal computer or the like or UDF (Universal Disk Format) used for DVD (Digital Versatile Disk) or the like. With the introduction of such a file system, not only real data to be recorded on the information medium but also management information such as locational information for facilitating access to the real data are recorded on the information medium.

Management information in the file system is concentrated often at a specific spot of an information medium. For example, management information of FAT is recorded in the vicinity of the head on the logical address of the information medium. A personal computer is a well known example as equipment including such a file system. Recently, the file system is included also in video equipment such as a video camera.

The following description is about a conventional file recording apparatus.

A vehicle camera system will be explained below as an example of equipment including a file recording apparatus. A vehicle camera system is formed of a camera unit and a main unit that can record, on an information medium such as a memory card, a video signal taken with the camera unit, and these units are connected through a cable or the like in use. The file recording apparatus is included in the main unit. A typical vehicle camera system has the capability of continuous recording for several hours. Therefore, the number of accesses to an information medium are rather large.

FIG. 12 is a block diagram showing a hardware configuration of a conventional file recording apparatus.

In FIG. 12, a file recording apparatus 40 includes a controller 41, a media controller 45, an encoder 46, an analog-digital converter (hereinafter, referred to as an AD converter) 47, and an interface 48. The controller 41, the media controller 45 and the encoder 46 are connected to a bus. A camera 20 is connected to the file recording apparatus 40 such that taken videos and audios are inputted in the file recording apparatus 40. An information medium 100 can be attached removably to the file recording apparatus 40.

The controller 41 includes a central processing unit (hereinafter referred to as a CPU) 42 for signal processing, a memory 43 on which work data are stored temporarily during the signal processing at the CPU 42, and a program storing portion 44 in which a program is stored. The CPU 42 and the program storing portion 44 are connected to the bus. In the program storing portion 44, programs such as an operating system are stored.

The media controller 45 can send and receive data or signals with the information medium 100 that can be attached removably to the file recording apparatus 40. For example, when the information medium 100 is formed as a memory card, the media controller 45 includes, for example, a connector to be connected electrically to an electric contact point included in the memory card, and a controlling circuit for controlling recording/reproducing of data or the like with respect to the memory card.

The camera unit 20 is connected to the interface 48 so that a video signal outputted from the camera unit 20 is inputted into the file recording apparatus 40.

The AD converter 47 converts a video signal (analog signal), which is inputted through the interface 48, to a digital video signal.

The encoder 46 compresses the digital video signal outputted from the AD converter 47 by a predetermined signal compression method. For example, the compression method is based on the MPEG4 standards (MPEG: Moving Picture Experts Group) that enables high-compression of dynamic images, but other compression methods can be used without any particular limitations.

The camera unit 20 includes an image pickup device such as a CCD image sensor and a lens, and it converts entering optical images to electric signals and outputs the signals. Operations of the camera unit 20 are controlled by the file recording apparatus 40.

In FIG. 12, an optical image taken with the camera unit 20 is converted to an analog video signal and outputted. The outputted analog video signal is inputted to the AD converter 47 through the interface 48. The AD converter 47 converts the thus inputted analog video signal to a digital video signal and outputs the digital video signal to the encoder 46. The encoder 46 subjects the thus inputted digital video signal to image compression by a predetermined compression format and outputs the signals. The digital video signal is processed at the CPU 42 and at the memory 43 on the basis of OS or the like stored in the program storing portion 44. Specifically, in accordance with a predetermined file system, management information and a file are generated. The thus generated management information and file are recorded on the information medium 100 through the media controller 45.

FIG. 13 is a block diagram showing a software configuration of a conventional file recording apparatus. The configuration as shown in FIG. 13 is included in the controller 41 in FIG. 12. As shown in FIG. 13, the controller 41 includes a file generator 144 for generating a file based on image data outputted from the encoder 46 (see FIG. 12) and a management information generator 145 for generating management information relating to the file generated at the file generator 144.

FIG. 14 is diagram showing contents recorded on an information medium, namely a file recorded by a conventional file recording method using a file system. In FIG. 14, the information medium 100 includes a specific area 102 and a data area 103 in this order when viewed from a logical head address 101. The specific area 102 denotes an area on which management information or the like of the applied file system is recorded. The data area 103 denotes an area on which real data of the file system are recorded.

In the data area 103, a recording file 130 comprising image data is recorded for example. Free areas 132 and 133 exist at parts where recording files are not recorded in the data area 103.

In the specific area 102, a management area 120 exists. In the management area 120, management information or the like is recorded. The management information denotes information including locational information or the like of the area allocated by the recording file 130 in the information medium 100. A free area 121 exists at a part where the management area 120 does not exist in the specific area 102.

An arrow 122 indicates a correlation that the management area 120 is updated corresponding to the end location of the recording file 130.

FIGS. 15A-15C are diagrams showing changes in contents of an information medium according to a conventional file recording method. In FIGS. 15A-15C, information media 100a, 100b and 100c denote examples of recording states of the information medium 100 during recording a file on the information medium 100 in FIG. 14, and FIGS. 15A-15C are arranged in a chronological order.

As shown in FIG. 15A, in the case of recording data additionally on a recording file 130a, the recording location 131a moves as shown as the recording location 131b in FIG. 15B and the recording location 131c in FIG. 15C. That is, the end location of the recording file 130 moves in a direction that the size of the file increases. And then, in accordance with arrows 122a, 122b and 122c, an update of the management information in the management area 120 will be performed without fail by the management information generator 145. Namely, on the information medium 100, rewrite is concentrated often to the management area 120 due to the file system.

In this case, for an information medium having a physical upper limit in the number of data rewriting cycles (for example, an optical disk or a flash memory), concentration of rewriting to the management area 120 can result in partial degradation so as to shorten the life of the information medium. Such a problem can be avoided on the basis of a hardware configuration of an information medium. For a flash memory, for example, a ware-leveling function for averaging the rewrite cycles have been known. Alternatively, a software configuration of an information medium can be relied on for this purpose. In an example of such methods, an area larger than the size of the management information is allocated in a storage area for management information of a file system previously as a reserved area in order to average the number of rewrite cycles of the management information within the reserved area (see JP 2004-79125 A)

However, the above-mentioned methods depending on the hardware configuration can cause problems that averaging of the rewrite numbers cannot be realized at all or partially due to some reasons relating to the standards, materials and configurations or the like of the information medium in use. For example, for an information medium where the whole area is divided into plural blocks and where averaging is limited to within the respective block units, the rewrite numbers among the respective blocks will not be averaged even though the rewrite numbers in the respective blocks will be averaged. That is, the rewrite numbers may be increased in only a specific block including a management area.

Furthermore, since the above-mentioned method depending on a software configuration employs special recording method and management method, compatibility with the existing file systems widely used may not be maintained.

SUMMARY OF THE INVENTION

Therefore, with the foregoing in mind, it is an object of the present invention to provide a file recording apparatus that extends the life of an information medium by avoiding concentration of rewriting of management information of a file system on a storage area while maintaining compatibility with an existing file system regardless of a hardware configuration or the software configuration of the file system of the information medium. The present invention aims also to provide a file recording method suitable for the file recording apparatus and a program that can perform the file recording method.

For achieving the object, a first method of file recording according to the present invention is a file recording method for recording management information and a file on a recording medium, the information medium comprising at least a specific area capable of recording the management information and a data area capable of recording the file, the method comprising: allocating, at a part of the file, a reserved area of a predetermined size continuous from a current recording location of the file under recording on the data area; recording, in the specific area, management information of the file comprising the reserved area; and starting a recording at the recording location when additionally recording data on the file so as to record the data on the reserved area.

Furthermore, a second method of file recording according to the present invention is a file recording method for recording management information and a file on a recording medium, the information medium comprising at least a specific area capable of recording the management information and a data area capable of recording the file, the method comprising: recording, in the specific area, the management information of the file under recording on the data area for a case where a reserved area of a predetermined size continuous from a current recording location is allocated at a part of the file, so that a virtual reserved area for the predetermined size continuous from the recording location is allocated; and recording data from the recording location with respect to the virtual reserved area when additionally recording data on the file.

A first configuration of a file recording apparatus according to the present invention relates to a file recording apparatus for recording management information and a file on an information medium, the information medium comprising at least a specific area capable of recording the management information and a data area capable of recording the file, the file recording apparatus comprising: a controller for generating the management information and the file from data inputted from the exterior, and a record-controller for recording on the information medium the management information and the file outputted from the controller; wherein the controller comprises: a file generator for generating a file to be recorded in the data area of the information medium, a management information generator for generating management information relating to the file generated at the file generator, a reserved area allocating portion for allocating a reserved area formed of data continuous from a current recording location of the file, and a size calculator for calculating a size of the reserved area to be allocated by the reserved area allocating portion.

A second configuration of a file recording apparatus according to the present invention relates to a file recording apparatus for recording management information and a file on an information medium, the information medium comprising at least a specific area capable of recording the management information and a data area capable of recording the file, the file recording apparatus comprising: a controller for generating the management information and the file from data inputted from the exterior, and a record-controller for recording on the information medium the management information and the file outputted from the controller; wherein the controller comprises: a file generator for generating a file to be recorded in the data area of the information medium, a management information generator for generating management information relating to the file generated at the file generator, a reserved area allocating portion for recording, in the specific area, the management information for a case where a reserved area in the file under recording on the data area of a predetermined size continuous from a current recording location is allocated at a part of the file, so that a virtual reserved area for the predetermined size continuous from the recording location is allocated, and a size calculator for calculating a size of the virtual reserved area.

BRIEF DESCRIPTION OF THE DRAWINGS

FIG. 4A is a diagram showing changes in contents of the information medium in the file recording method in Embodiment 1.

FIG. 4B is a diagram showing changes in contents of the information medium in the file recording method in Embodiment 1.

FIG. 4C is a diagram showing changes in contents of the information medium in the file recording method in Embodiment 1.

DETAILED DESCRIPTION OF THE INVENTION

Figure 1:
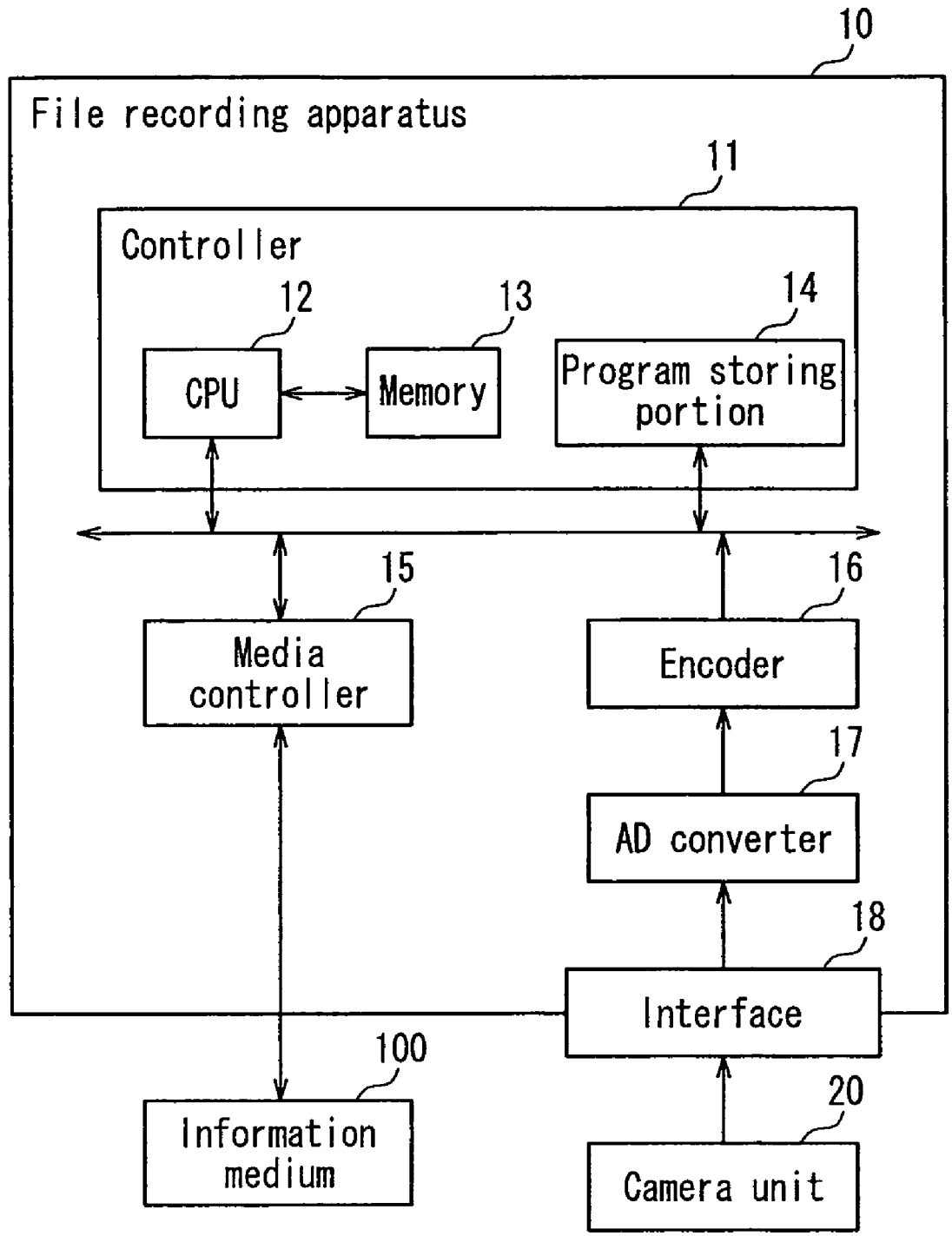
FIG. 1 is a block diagram showing a hardware configuration of a file recording apparatus in Embodiment 1.

The file recording method of the present invention can be a method wherein a timing for allocating either the reserved area or the virtual reserved area is determined on the basis of at least one selected from the group consisting of a whole size of the file under recording, a size of a free area in the data area on the information medium, a size of a remaining area in either the reserved area or the virtual reserved area, a time from the start of recording of the file under recording, and a timing that the recording location of the file reaches at least one logical address boundary of the information medium.

Alternatively, the file recording method of the present invention can be a method wherein the size for allocating either the reserved area or the virtual reserved area is determined in a correlation with at least one selected from the group consisting of a whole size of the file under recording, a size of a remaining area in either the reserved area or the virtual reserved area, a time from the start of recording of the file under recording, a size of a free area in the data area on the information medium, at least one logical address boundary of the information medium, a name of the file, and a data bandwidth of the file.

Alternatively, the file recording method of the present invention can be a method wherein either the reserved area or the virtual reserved area is deleted after ending the recording of the file.

The file recording apparatus of the present invention can have a configuration wherein a timing for allocating either the reserved area or the virtual reserved area in the reserved area allocating portion is determined on the basis of at least one selected from the group consisting of a whole size of the file under recording, a size of a free area in the data area on the information medium, a size of a remaining area in either the reserved area or the virtual reserved area, a time from the start of recording of the file under recording, and a timing when the recording location of the file reaches at least one logical address boundary of the information medium.

Alternatively, the file recording apparatus of the present invention can have a configuration wherein the size calculator calculates the size for allocating either the reserved area or the virtual reserved area on the basis of at least one selected from the group consisting of a whole size of the file under recording, a size of a remaining area in either the reserved area or the virtual reserved area, a time from the start of recording of the file under recording, a size of a free area in the data area on the information medium, at least one logical address boundary of the information medium, a name of the file, and a data bandwidth of the file.

According to the file recording method of the present invention, it is possible to avoid concentration of rewriting of the management information of a file system to a storage area, and thus the life of the information medium can be extended.

Since the process of allocating either the reserved area or the virtual reserved area is performed by a typical method of accessing to the file system, the compatibility with existing file systems can be maintained.

Embodiment 1

A file recording apparatus is an apparatus for converting inputted digital data to a file format and recording the data on an information medium. Such apparatuses are included in personal computers or video equipment such as video cameras. In this embodiment, a vehicle camera system is referred to as an example for equipment including a file recording apparatus, though it should be noted that the present invention will not be limited to the vehicle camera system.

A vehicle camera system is formed of a camera unit that is included in an automobile and that can take pictures of scenery forwards in the traveling direction, and a main unit capable of recording the thus taken video on an information medium. The camera unit and the main unit are connected to each other with cables or wireless communications so as to send and receive signals and data to/from each other. A file recording apparatus is assembled in the main unit. Since such a vehicle camera system is used often for continuous picture-taking for several hours in general, the number of accessing to information media is increased considerably.

FIG. 1 is a block diagram showing a hardware configuration of a file recording apparatus in Embodiment 1.

In FIG. 1, a file recording apparatus 10 includes a controller 11, a media controller 15, an encoder 16, an analog-digital converter (hereinafter, referred to as AD converter) 17, and an interface 18. The controller 11, the media controller 15 and the encoder 16 are connected to a bus. A camera 20 is connected to the file recording apparatus 10 so that taken video and audio are inputted to the file recording apparatus 10. To the file recording apparatus 10, an information medium 100 can be attached removably.

The controller 11 includes a central processing unit (hereinafter, referred to as CPU) 12 for processing signals, a memory 13 where work data are stored temporarily at the time of signal processing at the CPU 12, and a program storing portion 14 for storing programs. The CPU 12 and the program storing portion 14 are connected to the bus. The program storing portion 14 is formed of a flash memory for example, in which programs such as an operating system (OS) are stored.

The media controller 15 is capable of receiving and sending of data and signals with the information medium 100 that can be attached removably to the file recording apparatus 10. For example, when the information medium 100 is formed as a memory card, the media controller 15 is provided with, for example, a connector that will be connected electrically to an electric contact included in the memory card, and a controlling circuit for controlling recording/reproducing data or the like with respect to the memory card.

The interface 18 is connected to a camera unit 20 so as to input a video signal outputted from the camera unit 20 to the file recording apparatus 10.

The AD converter 17 converts an analog signal inputted through the interface 18 to a digital video signal. The thus inputted analog signal is a composite video signal, for example.

The encoder 16 compresses the digital video signal outputted from the AD converter 17 by a predetermined signal compression method. The compression method is based on the MPEG4 standards that allow compression of dynamic images, for example, but any other compression method can be applied instead.

The camera unit 20 includes an imaging device such as a CCD image sensor, a lens and the like, and it converts entering optical images to electric signals and outputs the electric signals. The operation of the camera unit 20 is controlled by the file recording apparatus 10.

The information medium 100 can be attached removably to the file recording apparatus 10, on which various kinds of data are recorded in a file format. The information medium 100 in this embodiment is a memory card such as a flash memory card including a semiconductor memory, but it can be replaced by other media such as an optical disk or a hard disk, as long as it is a medium corresponding to a file system such as FAT or UDF. The information medium 100 in this embodiment is a medium attached removably to the file recording apparatus 10, but alternatively it can be fixed in the apparatus.

In FIG. 1, the optical image taken with the camera unit 20 is converted to an analog video signal and outputted. The thus outputted analog video signal is inputted to the AD converter 17 through the interface 18. The AD converter 17 converts the thus inputted analog video signal to a digital video signal, and outputs the digital video signal to the encoder 16. The encoder 16 compresses the inputted digital video signal in a predetermined compression format. The compressed digital video signal is subjected to a signal processing at the CPU 12 and the memory 13, in accordance with the operating system stored in the program storing portion 14, for example. Specifically, management information and a file are generated in accordance with the predetermined file system. The thus generated management information and file are recorded on the information medium 100 through the media controller 15.

Though the above description refers to a configuration of recording video alone, it can refer also to a configuration of recording audio alone or a configuration of recording both video and audio.

Figure 2:
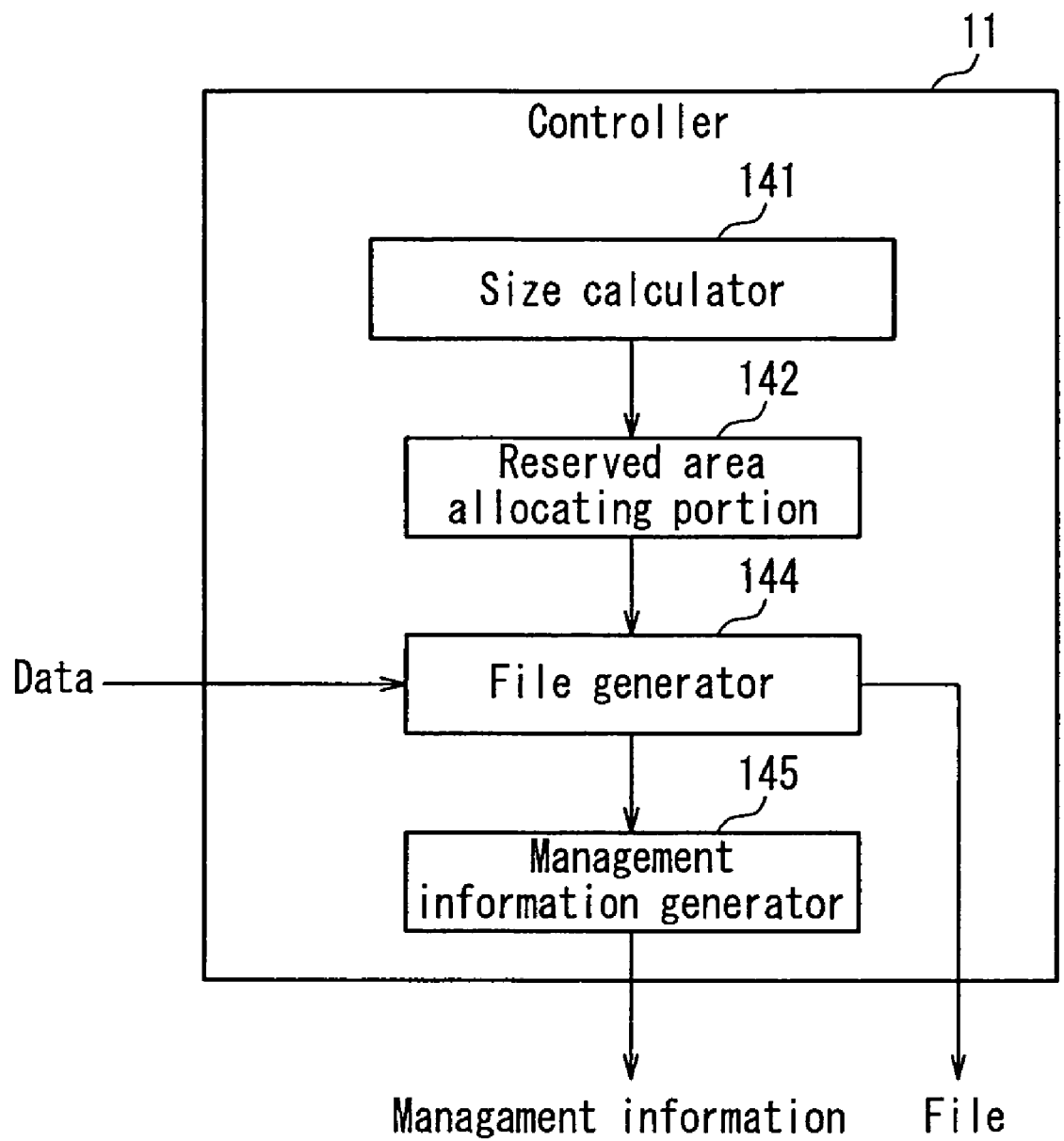
FIG. 2 is a block diagram showing a software configuration of a file recording apparatus in Embodiment 1.
Figure 3:
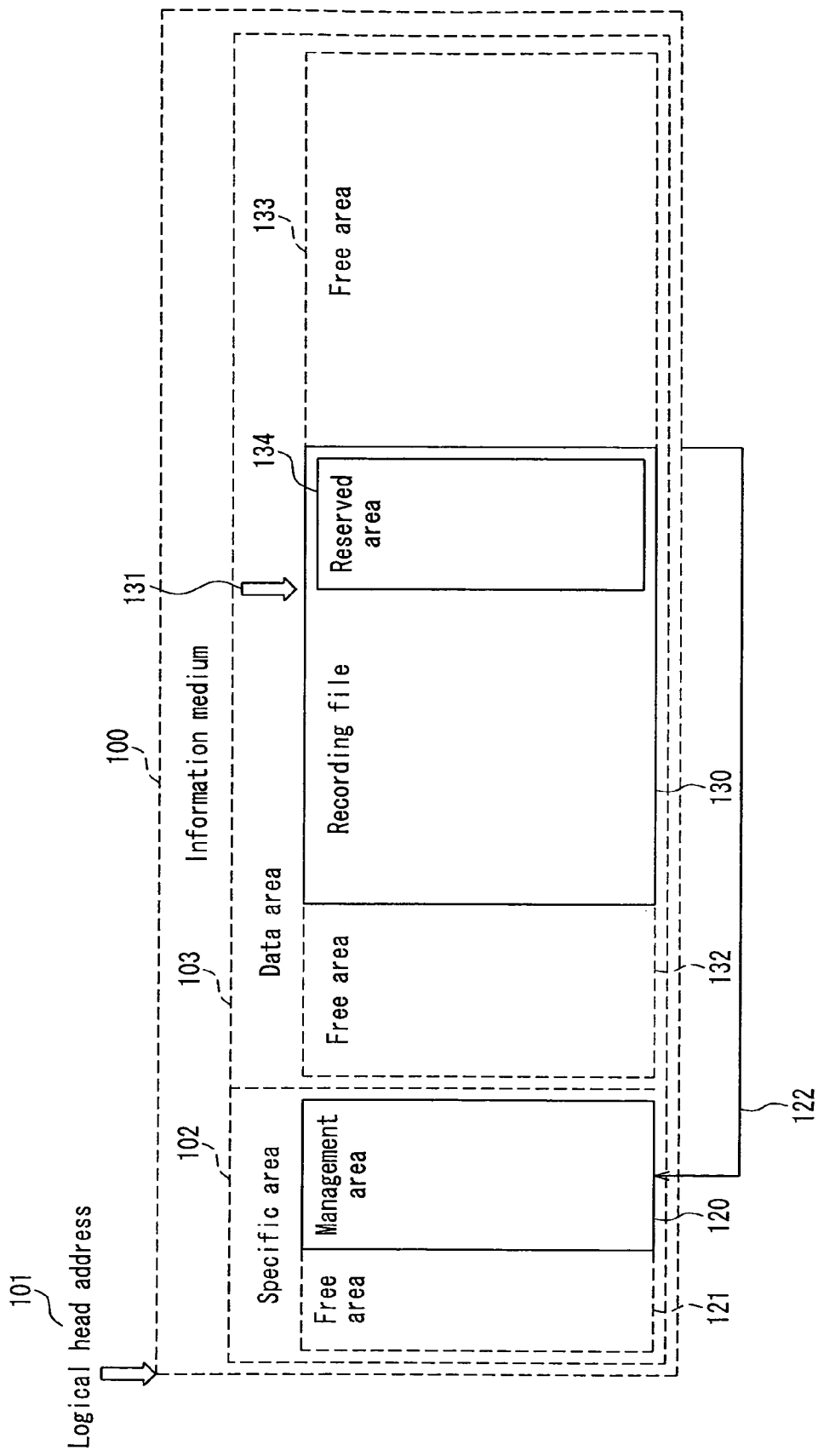
FIG. 3 is a schematic view showing a configuration of an information medium in a file recording method in Embodiment 1.

FIG. 2 is a block diagram showing a software configuration of the file recording apparatus in Embodiment 1. The configuration as shown in FIG. 2 is assembled in the controller 11 shown in FIG. 1. FIG. 3 is a schematic view showing recorded contents (logical structure) of the information medium.

As shown in FIG. 2, the controller 11 includes a size calculator 141, a reserved area allocating portion 142, a file generator 144, and a management information generator 145.

The size calculator 141 calculates a size of the reserved area 134 (see FIG. 3) to be allocated in the data area 103. The size of the reserved area 134 is calculated so that it will correlate with at least one of a whole size of the recording file 130 under recording, a size of a remaining area of the reserved area, a time from the start of recording on the recording file under recording, a size of a free area of the data area 103 on the information medium 100, at least one logical address interface of the information medium 100, a name of the recording file 130, and a data bandwidth of the recording file 130.

The reserved area allocating portion 142 allocates repeatedly at a specific frequency the reserved areas 134 of the size as calculated at the size calculator 141. Specifically, the reserved area allocating portion 142 designates a start address and an end address of the reserved area 134. The timing for allocating the reserved areas 134 is determined on the basis of at least one of a whole size of the recording file 130 under recording, a size of a free area of the data area 103 on the information medium 100, a size of a remaining area of the reserved area 134, a time from the start of recording on the recording file 130 under recording, and a timing that the recording location of the recording file 130 reaches at least one logical address of the information medium 100.

The file generator 144 generates a file on the basis of the data outputted from the encoder 16 (see FIG. 1). The thus generated file is written on the data area 103 of the information medium 100 through the media controller 15.

The management information generator 145 generates management information relating to the file generated at the file generator 144. The thus generated management information is written on the specific area 102 of the information medium 100 through the media controller 15.

Next, the logical structure of the information medium 100 will be described.

FIG. 3 is a diagram showing a logical structure of an information medium on which the file is recorded by the file recording method according to Embodiment 1.

In FIG. 3, the information medium 100 includes a specific area 102 and a data area 103 in this order when viewed from the logical head address 101.

The specific area 102 denotes an area on which management information or the like is recorded by the file system. The specific area 102 is provided with a management area 120 on which the management information is recorded. The management information includes locational information of the recording file 130, and the locational information is allocated on the data area 103. The free area 121 denotes a part of the specific area 102 other than the management area 120.

The data area 103 denotes an area on which real data (for example, video data) are recorded by the file system. The data area 103 includes the recording file 130, the free areas 132 and 133, and the reserved area 134. The recording file 130 recorded on the data area 103 includes real data such as video data.

The recording location 131 pointed with an arrow denotes a current recording location on the recording file 130. The recording location 131 shifts when the recording file 130 is recorded, when data are recorded additionally on the recording file 130, or when the recording file 130 is deleted.

The free areas 132 and 133 denote parts of the data area 103 on which the recording file 130 is not recorded.

The reserved area 134 denotes a part of the recording file 130 on which the real data are not written yet but reservation data for allocating previously the write area are written. In this embodiment, the reservation data are formed of dummy data.

In the data area 103, when a file is recorded on the information medium 100 or when a recorded file is deleted, the sizes of the recording file 130, the free areas 132 and 133 are increased/decreased.

An arrow 122 indicates a correlation that the management area 120 is updated corresponding to the move of the end location of the recording file 130.

FIGS. 4A-4C are diagrams showing changes in contents of the information medium by the file recording method in Embodiment 1, and the figures show that the contents change as shown in FIG. 4A, FIG. 4B and FIG. 4C in this order at the time of recording a file on the information medium 100. Information media 100a, 100b and 100c in FIGS. 4A-4C correspond to the information medium 100 in FIG. 3. Specific areas 102a, 102b and 102c correspond to the specific area 102 in FIG. 3. Data areas 103a, 103b and 103c correspond to the data area 103 in FIG. 3. Management areas 120a, 120b and 120c correspond to the management area 120 in FIG. 3. Free areas 121a, 121b and 121c correspond to the free area 121 in FIG. 3. Recording files 130a, 130b and 130c correspond to the recording file 130 in FIG. 3. Free areas 132a, 132b and 132c correspond to the free area 132 in FIG. 3. Free areas 133a, 133b and 133c correspond to the free area 133 in FIG. 3. Reserved areas 134a, 134b and 134c correspond to the reserved area 134 in FIG. 3.

Figure 5:
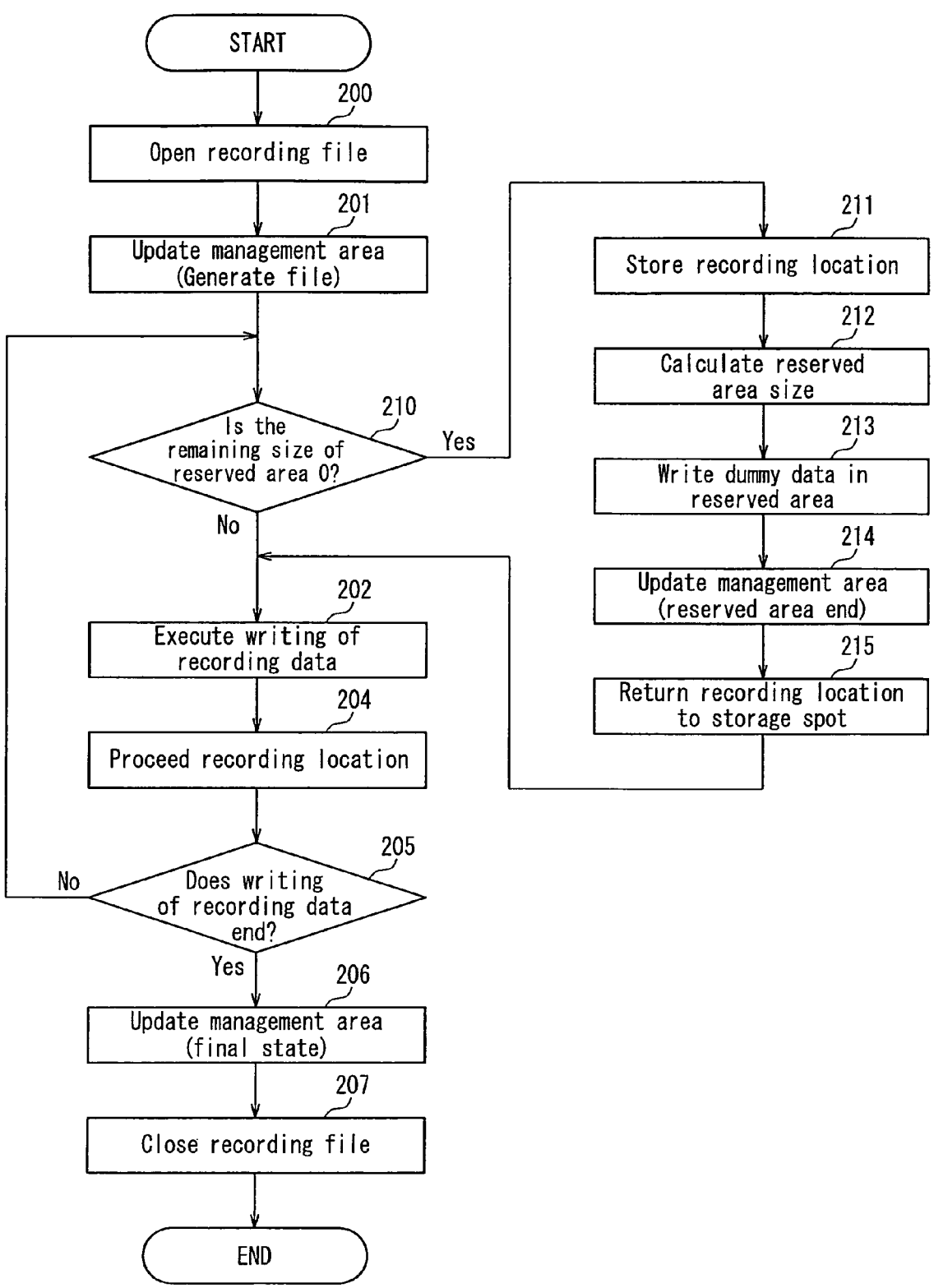
FIG. 5 is a flow chart showing a file recording process in Embodiment 1.

FIG. 5 is a flow chart showing a file recording procedure in Embodiment 1.

In FIG. 5, a step 200 denotes a process of executing an ordinary file system function (open) and newly generating and opening the recording file in a write mode.

A step 201 denotes a process of updating the management area 120 due to newly generating the recording file at the step 200.

A step 210 denotes a process of checking the residual capacity of the reserved area 134 before writing data, and determining necessity of allocating a new reserved area. Immediately after the file opening, the data residual capacity in the reserved area 134 is 0 i.e., no real data are recorded in the reserved area 134). When allocating a reserved area is necessary in the step 210, the process goes on to a step 211 for allocating the reserved area. When allocation of a reserved area is not necessary, the process goes on to a step 202.

Steps 211 to 215 denote processes for a case where allocating a new reserved area is determined as necessary in the step 210. The step 211 denotes a process of storing the recording start location of the current file. The step 212 denotes a process of calculating the size of a reserved area to be newly allocated. The step 213 denotes a process of executing a write process as a function of an ordinary file system so as to record dummy data for example, data entirely composed of '00' or data entirely composed of 'FF') for the size of a newly reserved area with respect to the recording file 130. The step 214 denotes a process of updating the management area 120 due to the recording of a new reserved area. And the step 215 denotes a process of executing a seek process as a function of an ordinary file system and recovering the write location of the recording file 130 to the recording start location as stored in the step 211.

The step 202 denotes a process of executing the write process as a function of an ordinary file system and recording the original data. The step 204 denotes a process in which the file system moves the recording start location of the data automatically, subsequent to the process of the step 202. The step 205 denotes a process of deciding whether the data recording has ended or not. The process returns to the step 210 if the recording has not ended in the step 205, and the step 205 goes on to the step 206 if the recording has ended. The step 206 denotes a process of updating the management area (directory entry or the like), subsequent to the end of the writing of the recording file. The step 207 denotes a process of executing the close process as a function of an ordinary file system so as to close the recording file.

The operations will be described below with reference to FIGS. 1-4.

In FIG. 1, the data to be inputted from the camera unit 20 to the data recording apparatus 10 are supposed as data including at least any of video data and audio data that are obtained by sampling realtime video and audio and processed to digital data. Generally, a feature of such a data recording is that the transmission of a constant data bandwidth continues for a long time.

The information medium 100 is formatted by the file system and managed per sector unit. As shown in FIG. 3, the file system provides management areas 120 locally on the information medium 100 so as to manage the information medium 100. Specific examples of the information medium 100 include optical disks and flash memories. Such an information medium 100 typically can be removed from the file recording apparatus 10, and it has excellent properties such as data portability and preservability. However, many of these information media have their rewrite lives. When the information medium 100 reaches the end in its rewrite life, the information medium becomes unavailable. Since the information medium must be exchanged with a new information medium, the operating cost will be raised. In addition to that, when there is a failure in the realtime data recording, the recovery is difficult in general.

In the file recording apparatus 10, when data are recorded as a recording file 130 on the data area 103 of the information medium 100, the reserved area allocating portion 142 (see FIG. 2) allocates the reserved area 134 at the end of the recording file 130 (see FIG. 3).

The explanation below refers to a case of additionally recording data on the recording file 130, namely, a case where the recorded contents on the information medium 100 as shown in FIG. 4A changes to the contents as shown in FIG. 4B.

When the file generator 144 as shown in FIG. 2 performs an additional recording of data with respect to the recording file 130a (step 202 in FIG. 5), the file generator 144 executes the write process as a function of an ordinary file system. And then, the data to be additionally recorded are recorded on the reserved area 134a, starting from the current recording location 131a as shown in FIG. 4A. As a result, the recording location 131a of the recording file 130a moves to a location shown as the recording location 131b in FIG. 4B, thereby reducing the reserved area 134 in the part (step 204 in FIG. 5). At that time, the reserved area 134a of the recording file 130a is reduced to form the reserved area 134b as shown in FIG. 4B by the size corresponding to the added data. On the other hand, the end location of the recording file 130a including the reserved area 134a as shown in FIG. 4A and the end location of the recording file 130b including the reserved area 134b as shown in FIG. 4B are kept constant, and thus no new sector allocation will occur with respect to the file 130. Therefore, there is no necessity to update the management area 120b.

The next explanation is about a case where the contents of the information medium 100 as shown in FIG. 4B change to the contents as shown in FIG. 4C.

As a result of the additional recording of data by the file generator 144 (step 202 in FIG. 5), the recording location 131b of the recording file 130b as shown in FIG. 4B moves to the recording location 131c (step 204 in FIG. 5) of the recording file 130c as shown in FIG. 4C.

At that time, the reserved area 134b is used up and there occurs a deficiency with respect to the size corresponding to the data to be additionally recorded (a case where the size of the remaining area in the reserved area is decided as zero in the step 210 of FIG. 5). In such a case, the reserved area allocating portion 142 allocates a new reserved area 134c (steps 211 to 213 in FIG. 5) on the basis of the size calculated by the size calculator 141 as shown in FIG. 2.

Specifically, in the step 211, the reserved area allocating portion 142 stored a current file write starting location 131c. Next, in the step 212, the size calculator 141 calculates the size of the reserved area to be newly allocated. Next, in the step 213, the reserved area allocating portion 142 executes the write process as a function of an ordinary file system, and records dummy data (for example, data entirely composed of '00' or data entirely composed of 'FF') for the size of the new reserved area 134c from the current recording location 131c with respect to the recording file 130.

As a result of newly allocating the reserved area 134c in this manner, the end location of the recording file 130b including the reserved area 134b and the end location of the recording file 130c including the reserved area 134c change. At this time, the management information generator 145 updates the management area 120c in the specific area 102 (step 214 in FIG. 5). At this time, since the current recording location is right behind the reserved area 134c, the seek process as a function of an ordinary file system is executed to return the write location of the recording file to the recording location 131c (the starting location for recording of the original recording data) stored in the step 211 (step 215 in FIG. 5). By executing the processes in steps 211-215 in this manner, the reserved area 134 of a predetermined size continuous from the current recording location 131c can be allocated at a part of the recording file 130 without changing the current recording location.

Thereafter, by the time that the newly allocated reserved area 134 is used up again, update of the management area 120c by the additional recording of data can be suppressed.

The size calculator 141 in FIG. 2 can calculate the size of the reserved area to be allocated in a process on the basis of the bandwidth of data and the frequency (interval) for allocating the reserved area. It is noted here that the data bandwidth is always constant for all of the recording data and previously managed by the size calculator 141. The frequency for allocating the reserved area is calculated on the basis of the rewrite life that should be allocated by the information medium 100. At this time, for example, in a case where the bandwidth of the data is 1 megabit/second and the interval for allocating the reserved area 134 (i.e., the interval for allocating a reserved area) is 40 seconds, the data size is 1×40/8=5 megabytes in a data recording at 1 megabit/second for 40 seconds. Therefore, the size of the reserved area 134 calculated by the size calculator 141 is 5 megabytes.

Allocation of the reserved area 134 in the recording file 130 is performed repeatedly at an interval for allocating the reserved area by the reserved area allocating portion 142. The size of the reserved area at this time is equal to or more than the size calculated by the size calculator 141. In the step 210 of FIG. 5, the reserved area allocating portion 142 operates to allocate a new reserved area 134 at a timing that the residual capacity of the reserved area 134 runs short. In the above example, a reserved area 134 of 5 megabytes is allocated newly every 40 seconds.

As mentioned above, in the file recording method in Embodiment 1, a sufficient size of the reserved area 134 is allocated with respect to the unit size for processing the additional recording of data, so that the frequency for update of the management area 120 can be reduced considerably. That is, in a file system where management information is managed locally, it will be possible to avoid the concentration of rewriting of the management information to a recording area, so that the life of the information medium 100 can be extended.

Moreover, since the process of allocating the reserved area 134 is executed by an ordinary method of accessing to a file system as shown in the step 213, an existing file can be applied directly. Therefore, the compatibility can be allocated.

In the file recording apparatus 10, since the processes of deciding and allocating the size of the reserved area 134 can be performed in a manner suitable for the characteristics of the recording file 130, the data can be in any format such as text data, static image data and program data.

The information medium 100 can be a format fixed to the file recording apparatus 10, or it can be provided separately from the file recording apparatus 10. When the information medium 100 is provided separately, the information medium 100 can be connected to the file recording apparatus 10 through a cable or wireless communications. Alternatively, the information medium 100 can be formed attachable to a terminal included in the file recording apparatus 10.

Furthermore, the file recording apparatus 10 can access to the information medium 100 through an existing file system. Therefore, one or plural file(s) other than the recording file 130 can be present in the data area 103. Alternatively, one or plural file(s) under recording by a method of recording according to this embodiment just like the recording file 130 can be present simultaneously.

The recording file 130 is not limited particularly as long as it holds continuity on the file system. The recording file 130 may be arranged in a physically divided state on the data area 103.

The recording location 131 is not limited particularly as long as it moves on the file system in a direction for increasing the recording file 130. There is no particular limitation on the order of the directions for moving the physical location on the information medium 100.

The timing for repeatedly allocating a new reserved area 134 can be determined in a correlation with a size of a recorded area acquired by the reserved area allocating portion 142 at the moment in the recording file 130 directly or indirectly from the file system 143. For example, when the size of the recorded area in the recording file 130 is less than 1 megabyte, allocation of a reserved area 134 is not performed. When the same size becomes 1 megabyte or more, a reserved area 134 of 5 megabytes will be allocated. Thereafter, every time the size of the recorded area in the recording file 130 increases by 5 megabytes, the reserved area allocating portion 142 carries out a correlation so as to allocate a reserved area 134 of 5 megabytes. This is effective in that allocation of unnecessary reserved area can be avoided with respect to a file whose size is small all the time.

The timing for repeatedly allocating a new reserved area 134 can be determined in a correlation with a time that is counted directly or indirectly by the reserved area allocating portion 142 from the start of recording. For example, when recording of plural recording files 130 starts simultaneously, the reserved area allocating portion 142 correlates the timings for allocating the reserved areas 134 in the respective recording files 130 so that the timings will offset in time. This is effective in avoiding concentration of allocating the respective reserved areas 134 in the plural recording files 130 in one process, thereby dispersing loads of the processes.

The timing for repeatedly allocating a new reserved area 134 can be determined in a correlation with a size of the remaining area in the reserved area 134 as a difference between an end location and a current write location of the recording file, where the end location and the current write location are acquired by the reserved area allocating portion 142 directly or indirectly from the file system 143. For example, when video data that have been video-compressed at a variable rate are recorded as a recording file 130, each size for writing on the recording file 130 may change every time because the data amount per unit time varies depending on the video contents. At this time, when the maximum size width of the change is supposed to be 1 megabyte for example, the reserved area allocating portion 142 carries out a correlation so that a new reserved area 134 is allocated every time the size of the remaining area in the reserved area 134 is decreased to 1 megabyte or less. As a result, a data unit for each write size is divided so that allocation of a new reserved area becomes unnecessary, and thus effectiveness in the allocating process can be improved.

The timing for repeatedly allocating a new reserved area 134 can be determined in a correlation with a total value of the sizes of the free areas 132 and 133, where each of the sizes denote a size of the remaining area of the data area 103 acquired by the reserved area allocating portion 142 directly or indirectly from the file system 143. For example, when the free areas are 50 megabytes or more, a reserved area 134 is allocated every time at a constant timing. When the free areas become less than 50 megabytes, the reserved area allocating portion 142 works for carrying out a correlation in order not to allocate a reserved area 134. Without the above operation, a reserved area would be allocated even if a free area was insufficient, and areas required for other files could not be allocated. Therefore, the operation is effective in preventing the problem.

Alternatively, a timing for repeatedly allocating a new reserved area 134 can be determined as a moment that the reserved area allocating portion 142 acquires a recording location 131 of the recording file 130 directly or indirectly and the location reaches at least one logical address boundary of the information medium 100 over a predetermined time. For a case of a file system, the file 130 is managed in a block unit formed of a set of plural sectors or a cluster unit. Therefore, when accessing the information medium 100 by correlating with the logical address boundaries, improvement in the access speed can be expected.

That is, the timing is not limited particularly as long as it correlates with at least one phenomenon that can occur repeatedly in a periodic or cyclic manner.

The size of the reserved area 134 to be newly allocated always can be constant.

The size of a reserved area 134 to be newly allocated can be determined in a correlation with the size of the recorded area in the recording file 130 under recording, where the size is acquired by the size calculator 141 directly or indirectly from the file system 143. For example, when the size of the recorded area in the recording file 130 is less than 1 megabyte, the size for allocating the reserved area 134 is set to zero. When the size is not smaller than 1 megabyte but smaller than 5 megabytes, the size for allocating the reserved area 134 is set to 1 megabyte. And when the size is 5 megabytes or bigger, the size for allocating the reserved area 134 is set to 5 megabytes. In this manner, the size calculator 141 carries out a correlation with the size of the reserved area 134. This is effective since reserved areas can be allocated in accordance with properties of various recording files. For example, when the size of the recording file 130 is small all the time, the reserved area 134 will not be allocated. When the size of the recording file 130 increases relatively slowly, reserved areas 134 of not more than 5 megabytes will be allocated.

The size of a reserved area 134 to be newly allocated can be determined in a correlation with the time counted by the size calculator 141 directly or indirectly from the start of recording. For example, when the time from the start of recording of the recording file 130 is shorter than 10 seconds, the size for allocating the reserved area 134 is set to zero. When the time is not shorter than 10 seconds but shorter than 5 minutes, the size for allocating the reserved area is set to 1 megabyte. When the time is 5 minutes or longer, the size for allocating the reserved area 134 is set to 5 megabytes. In this manner, the size calculator 141 carries out a correlation with the size of the reserved area 134. This is effective since reserved areas can be allocated in accordance with properties of various recording files. For example, when the recording time of the recording file 130 is short all the time, the reserved area 134 will not be allocated. When the recording of the recording file 130 continues for a long time, a reserved area 134 of not more than 5 megabytes will be allocated.

Alternatively, the size of the reserved area 134 to be newly allocated can be determined in a correlation with calculated values of frequency (intervals) calculated by the size calculator 141 to acquire directly or indirectly the data bandwidth and to allocate the reserved area 134. For example, when video data being video-compressed at a variable rate are recorded as a recording file 130, the application software allows the size calculator 141 to designate dynamically with a parameter the frequency to allocate the data bandwidth and the reserved area of the variable rate to carry out a correlation with the frequency. This is effective since the size suitable for the designated variable rate can be allocated dynamically.

Alternatively, the size of a reserved area 134 to be newly allocated can be determined in a correlation with the size of the remaining area in the reserved area 134, where the size is a difference between an end location and a current write location of the recording file and which is acquired by the size calculator 141 directly or indirectly from the file system 143. For example, when video data being video-compressed at a variable rate are recorded as a recording file 130, since the data amount per unit time changes depending on the video contents, the size for writing on the recording file 130 may change every time. At this time, for newly allocating the reserved area 134 at a constant interval, the size calculator 141 carries out a correlation with the difference from the size of the remaining area in the reserved area 134 so that the size of the remaining area in a new reserved area 134 just after being allocated becomes constant all the time. In this case, since the timing for newly allocating the reserved area 134 can have a constant interval, a periodical planning of the process and the dispersion of the process loads can be performed easily.

Alternatively, the size of the reserved area 143 to be newly allocated can be determined in the manner that the size calculator 141 acquires directly or indirectly the end location of the recording file 130 including the reserved area 134 and that the location becomes the logical address boundary of the information medium 100 after exceeding a predetermined size. For example, in the case of a file system, the file 130 is managed in a block unit comprising a group of plural sectors or in a cluster unit. Therefore, in the case of correlating with their logical address boundaries so as to access to the information medium 100, the improvement in the access speed can be expected.

Alternatively, the size of the reserved area 143 to be newly allocated can be determined in correlation with a file name or an extension of a file name of the recording file 130 acquired directly or indirectly by the size calculator 141. In an example where '.AV' is used for the extension of the file name of the recording file of video data or audio data and '.TXT' is used for the extension of the text file, the size of the reserved area 134 to be newly allocated is determined to be 5 megabytes if the extension of the file name of the recording file 130 is '.AV', and it is determined to be 1 megabyte if the extension of the fine name of the recording file 130 is '.TXT'. In this manner, a reserved area with a size suitable for various files can be allocated.

That is, there is no particular limitation for the size of the reserved area 134 to be newly allocated as long as the size correlates with the current state of at least one phenomenon.

The data bandwidth can be managed previously by the size calculator 141. Alternatively, the file generator 144 can provide the size calculator 141 with the data bandwidth information included in the data 150 as a parameter.

Embodiment 2

A file recording method in Embodiment 2 is the same as that in Embodiment 1, except that unnecessary reserved areas are deleted at the time of ending the data recording. The configuration of the file recording apparatus in Embodiment 2 is the same as in Embodiment 1 as shown in FIGS. 1 and 2.

Figure 6A:
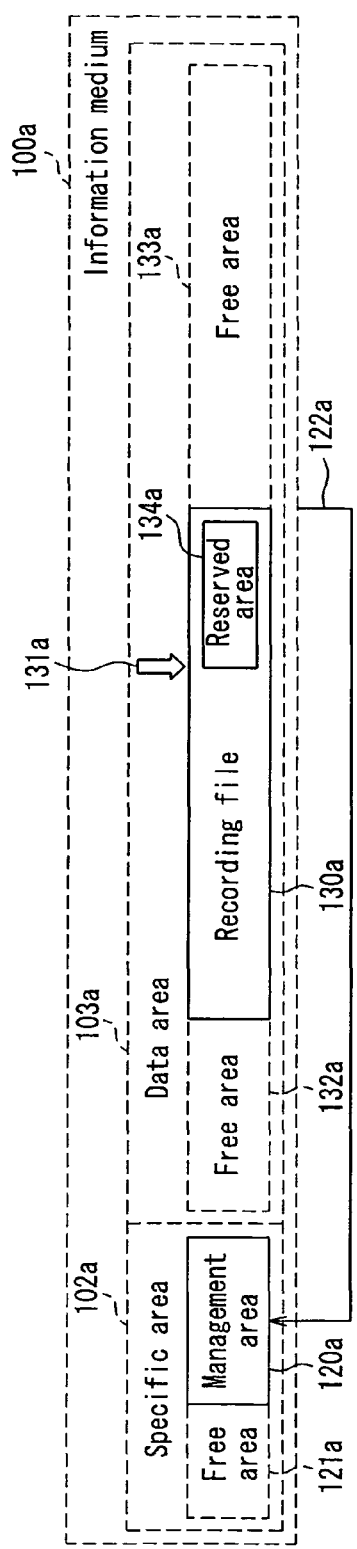
FIG. 6A is a diagram showing changes in contents of an information medium in the file recording method in Embodiment 2.
Figure 6B:
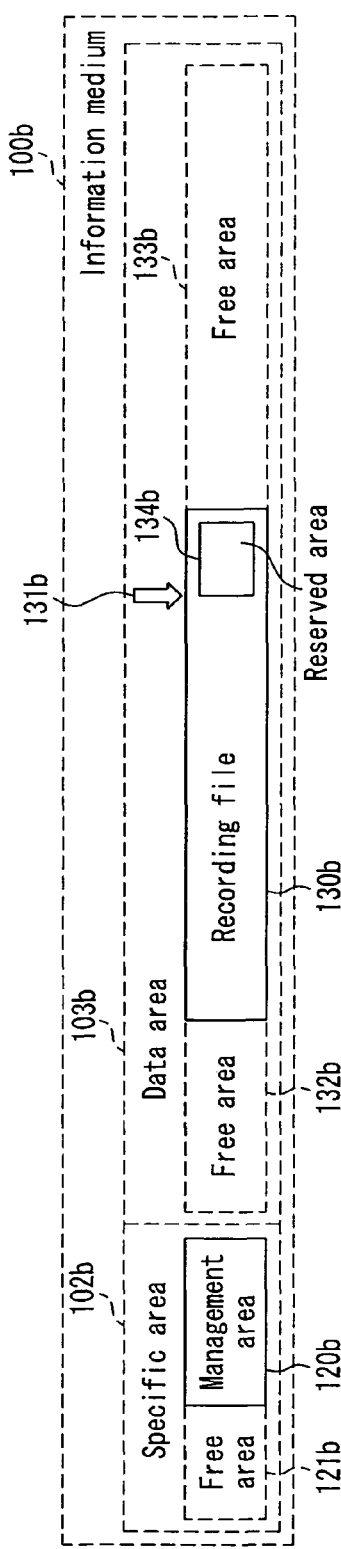
FIG. 6B is a diagram showing changes in contents of the information medium in the file recording method in Embodiment 2.
Figure 6C:
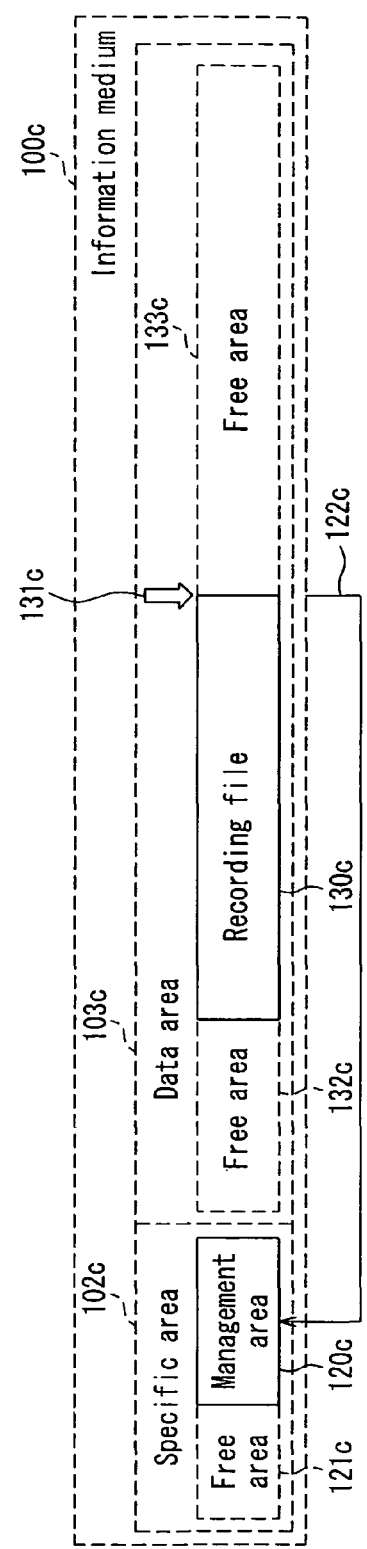
FIG. 6C is a diagram showing changes in contents of the information medium in the file recording method in Embodiment 2.

FIGS. 6A, 6B and 6C are diagrams showing changes in contents of the information medium 100 according to the file recording method in Embodiment 2. FIG. 6A shows an initial state. FIG. 6B shows a state where data are added to the recording file 130. FIG. 6C shows a state where the reserved area 134 is deleted.

In FIGS. 6A-6C, information media 100a, 100b and 100c denote an example of recorded contents in the information media 100, and these figures are arranged in a chronological order from the state under a file recording to the state at the end of the file recording. The information medium 100a denotes contents under a data recording. The information medium 100b denotes contents just after recording the last data. The information medium 100c denotes contents after finishing the process for ending the file recording. The remaining components identical to those in FIG. 3 will be provided with the identical numbers.

Figure 7:
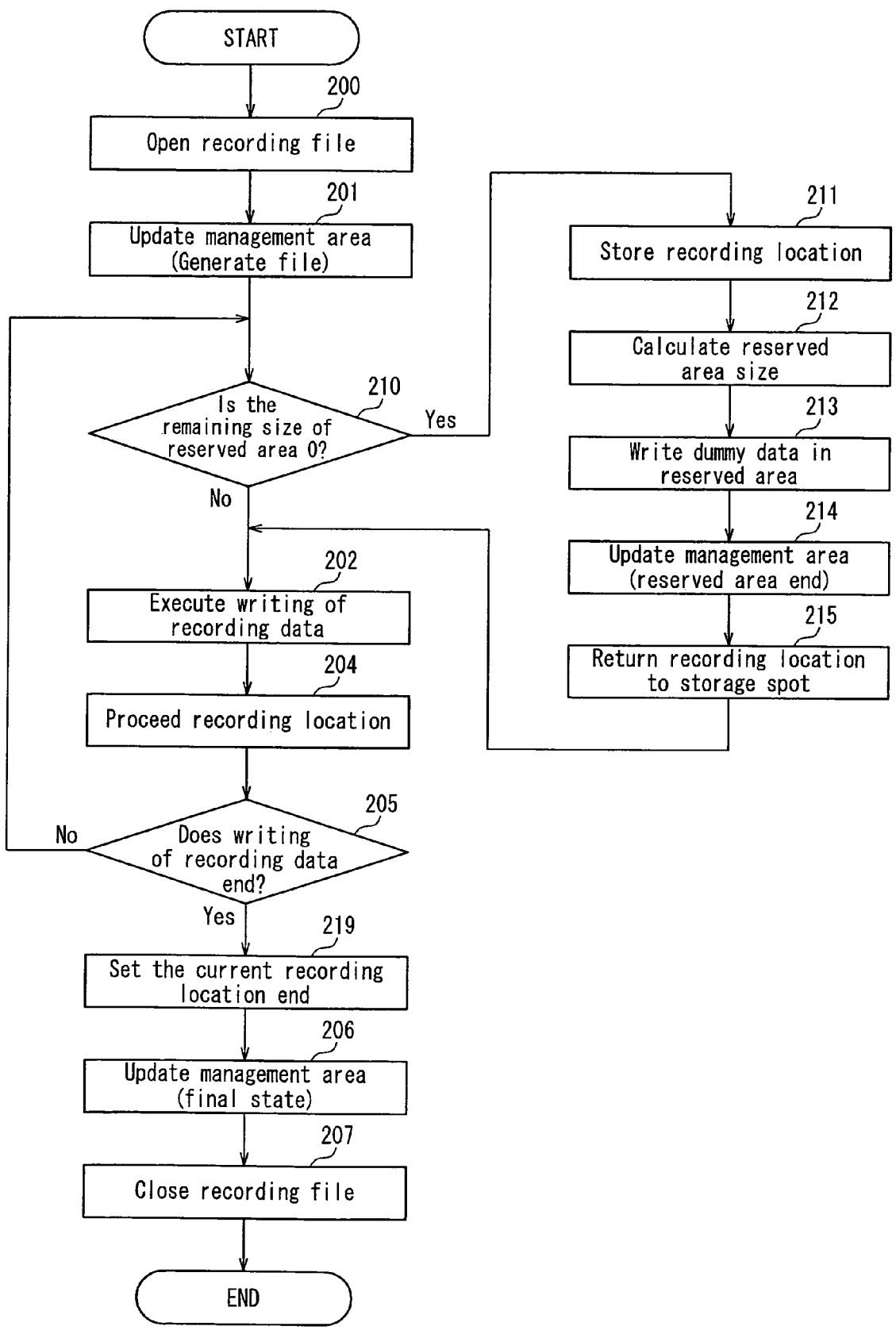
FIG. 7 is a flow chart showing a file recording process in Embodiment 2.

FIG. 7 is a flow chart showing a file recording process procedure in Embodiment 2. The flow chart in FIG. 7 is different from the flow chart in FIG. 5 in that a step 219 is added. The step 219 denotes a process of executing a truncate process as a function of an ordinary file system, and abandoning data subsequent to the current location of the recording file so as to shorten the data.

The operations will be described below.

Since the change in the recorded contents from the information medium 100a shown in FIG. 6A to the information medium 100b shown in FIG. 6B is similar to the case of contents changes in file recording in Embodiment 1, the explanation will be omitted.

A change in the recorded contents from the information medium 100b as shown in FIG. 6B to the information medium 100c as shown in FIG. 6C will be described below. In FIG. 6B, the move of the recording location of the recording file 130b (the current location 131b) stops when the recording of the last data is finished. In this case, the part behind the current location 131b of the recording file 130b denotes a reserved area 134b. This reserved area 134b becomes unnecessary after the file recording is finished. Therefore, the file generator 144 works to execute the truncate process, abandon the data of the reserved area 134b subsequent to the current location 131b of the recording file so as to shorten the data (step 219 in FIG. 7).

Here, since the reserved area 134b is deleted, the end location of the recording file 130b including the reserved area 134b (FIG. 6B) changes as shown at the end location of the recording file 130c in FIG. 6C. Therefore, as indicated by an arrow 122c with respect to the management area 120c, the management information in the management area 120c is updated (step 206 in FIG. 7)

As mentioned above, in the file recording method according to Embodiment 2, the file state after ending the file recording (see FIG. 6C) is substantially the same as the file state in a case where the file recording method of the present invention is not applied.

Furthermore, since the process for allocating the reserved area 134 is performed by a typical method for accessing the file system as shown in the step 213, an existing file system can be used directly. Therefore, the compatibility is maintained.

Embodiment 3

The file recording method in Embodiment 3 is the same as that in Embodiment 1 except that the size of the reserved area to be allocated is adjusted when the residual capacity of the information medium 100 is deficient. The configuration of the file recording apparatus in Embodiment 3 is the same as in Embodiment 1 as shown in FIGS. 1 and 2.

Figure 8A:
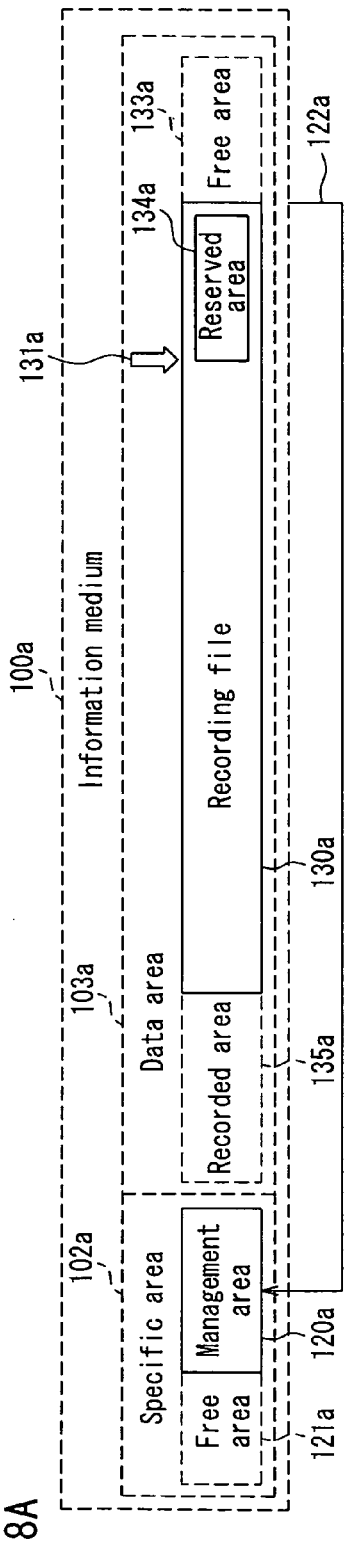
FIG. 8A is a diagram showing changes in contents of an information medium in the file recording method in Embodiment 3.
Figure 8B:
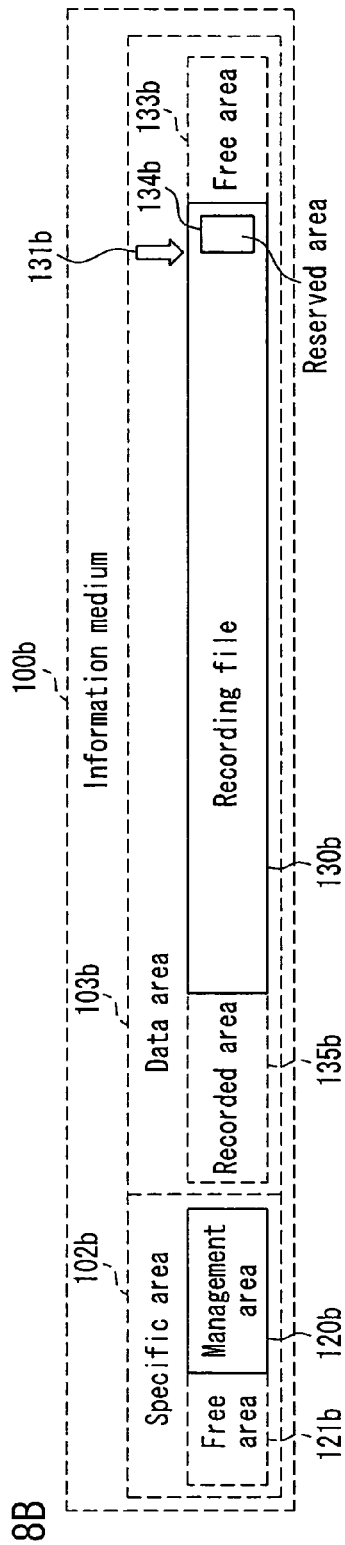
FIG. 8B is a diagram showing changes in contents of the information medium in the file recording method in Embodiment 3.
Figure 8C:
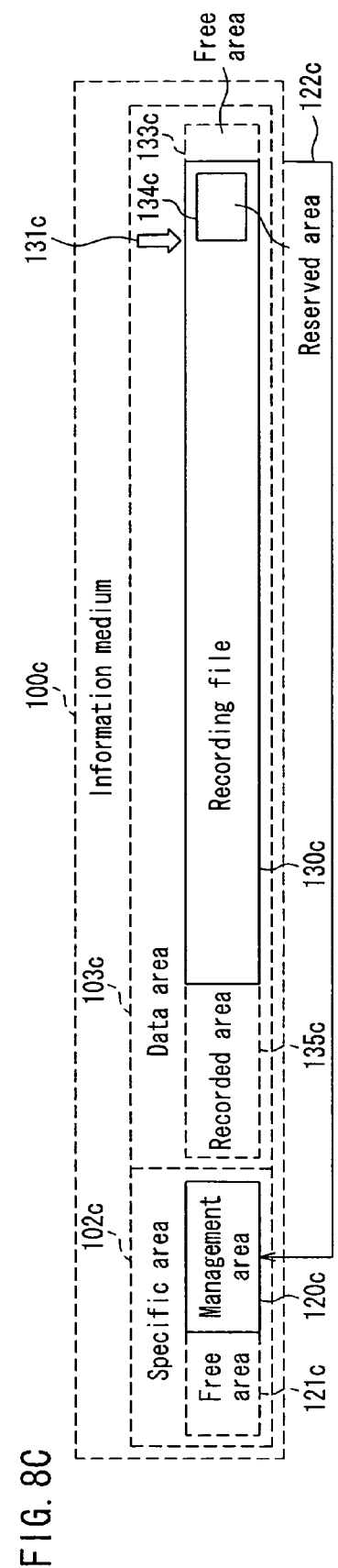
FIG. 8C is a diagram showing changes in contents of the information medium in the file recording method in Embodiment 3.

FIGS. 8A, 8B and 8C are diagrams showing changes in contents of the information medium 100 in Embodiment 3. FIG. 8A shows an initial state. FIG. 8B shows a state where data are recorded on the reserved area 134. FIG. 8C shows a state that the reserved area 134 is added.

In FIGS. 8A-8C, information media 100a, 100b and 100c denote an example of recorded contents under file recording in a state where the residual capacity of the information medium 100 is extremely deficient, and the figures are arranged in a chronological order. Recorded areas 135a, 135b and 135c denote areas where recording files other than the recording files 130a, 130b and 130c are recorded respectively in the data area 103a, 103b and 103c, and the areas cannot be used as reserved areas anymore. The remaining components identical to those in FIG. 3 will be provided with the identical numbers, and the explanation will be omitted.

The file recording process in Embodiment 3 is performed as the file recording process in Embodiment 1 shown in FIG. 5, except for the procedure in a step 212.

The operations will be described below.

Since the change in the contents in a course from the information medium 100a as shown in FIG. 8A to the information medium 100b in FIG. 8B is the same as the case of file recording in Embodiment 1, the explanations will be omitted.

The change in contents from the information medium 100b as shown in FIG. 8B to the information medium 100c as shown in FIG. 8C will be described below. In FIG. 8B, due to the additional recording of data, the recording location 131b of the recording file 130b moves to the recording location 131c of the recording file 130c as shown in FIG. 8C.

There is a possibility at that time that the reserved area 134 is used up and that the reserved area deficiency occurs with respect to the data to be recorded additionally. In this case, a new reserved area will be allocated. However, in some cases, a reserved area of a sufficient size cannot be allocated due to the extreme deficiency of the free area 133b as shown in FIG. 8B. In other cases, when a reserved area for the size corresponding to the free area 133b is allocated, the free area 133c in the data area 103c will be consumed, and thus no files other than the recording file 130c can be recorded.

Here, when a reserved area 134c is allocated newly in a state where the free area 133b is extremely deficient as shown in FIG. 8B, the size for allocating is adjusted, and the size of the reserved area 134c is determined so that the free area 133c will remain as shown in FIG. 8C (step 212 in FIG. 5). The size of the reserved area 134c can be determined, for example, as a half the size of the free area 133b. In such a case, by allocating newly the reserved area 134c, the end location of the recording file 130b including the reserved area 134b and the end location of the recording file 130c including the reserved area 134c will change. At this time, the management area 120c is updated (step 214 in FIG. 5).

In the above-mentioned file recording method in Embodiment 3, the size of the reserved area 134 is determined and allocated in a correlation with the size of the free area 133 of the data area 103, so that influences on recording on the other files can be suppressed.

Moreover, since an ordinary method to access the file system is used for a process of allocating a reserved area of an adjusted size, an existing file system can be used directly, and thus the compatibility can be maintained.

Alternatively, the size of the newly allocated reserved area 134c can be determined so that the free area 133c will not remain in a state where the free area 133b is extremely deficient so that the effect of extending the life of the information medium 100 in this embodiment can be optimized. Moreover, the size of the reserved area 134c to be newly allocated can be set to zero so that the process of allocating the reserved area can be simplified.

Embodiment 4

The file recording method in Embodiment 4 is distinguished from the file recording method in any of Embodiments 1-3 in that a reserved area is allocated only on a management area although the reserved area is allocated by writing data on a data area. That is, a reserved area is allocated virtually by recording management information on a specific area for a case where it is hypothesized that the reserved area (a reserved area of a predetermined size continuous from the current recording location of the recording file) is allocated at a part of the recording file. Since the other components are the same as those in Embodiments 1-3, the explanation will be omitted.

Figure 9:
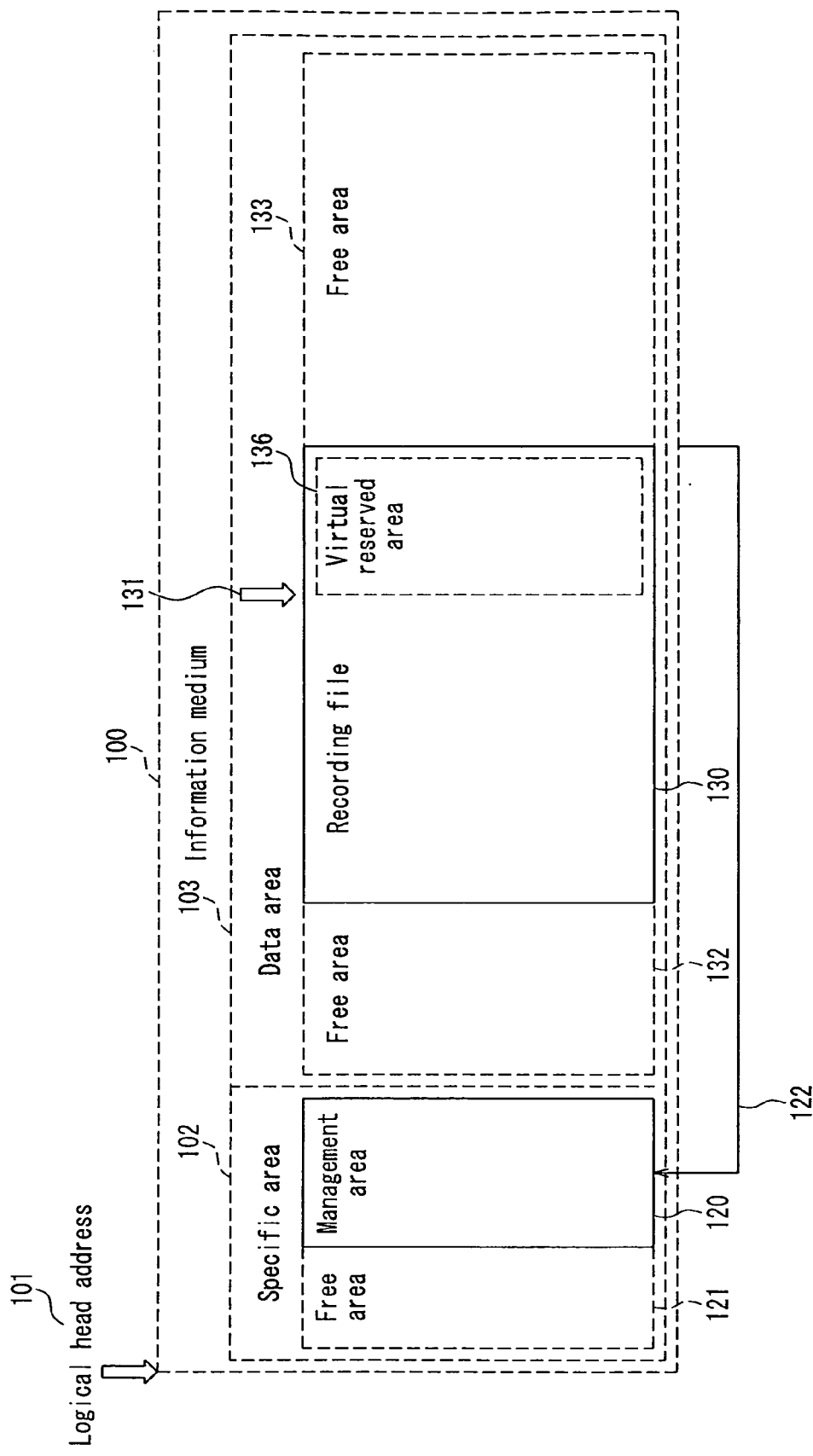
FIG. 9 is a schematic view showing a configuration of an information medium in a file recording method in Embodiment 4.

FIG. 9 is a diagram showing recorded contents of an information medium on which a file is recorded by the file recording method according to Embodiment 4. In FIG. 9, a virtual reserved area 136 denotes an area that is included in the recording file 130 and on which real data have not been written. Specifically, it is an area allocated to the recording file 130 only on the management area 120 for the purpose of allocating a write area. Other components identical to those in FIG. 3 are assigned with identical numbers and the explanation will be omitted.

Figure 10:
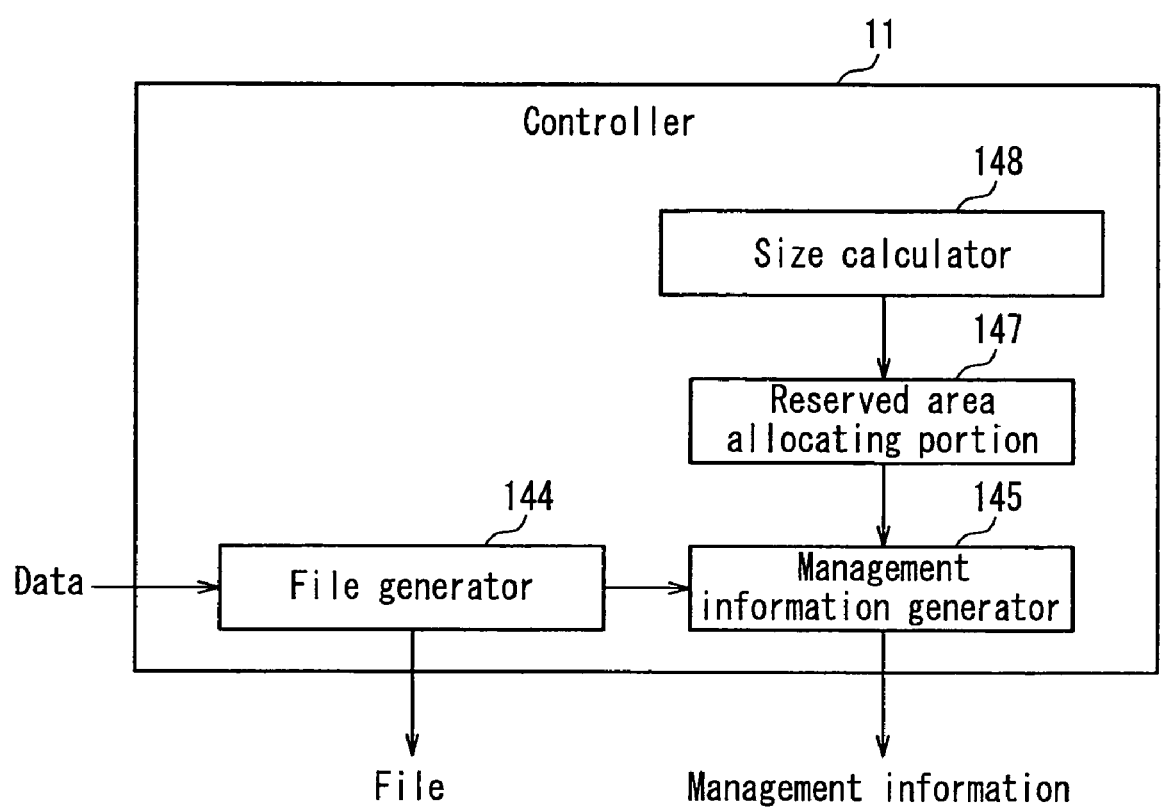
FIG. 10 is a block diagram showing a software configuration of a file recording apparatus in Embodiment 4.

FIG. 10 is a diagram showing a software configuration of a file recording apparatus in Embodiment 4. In FIG. 10, a size calculator 148 calculates a size of a virtual reserved area 136 to be newly allocated. A virtual area allocating portion 147 works to allocate a virtual reserved area of a size calculated at the size calculator 148, repeatedly at a desired frequency. A file generator 144 records data on a data area 103 of the information medium 100. A management information generator 145 records management information of the file system on the management area 120 when a virtual reserved area is allocated by the reserved area allocating portion 147 and when the file generator 144 records the file.

Figure 11:
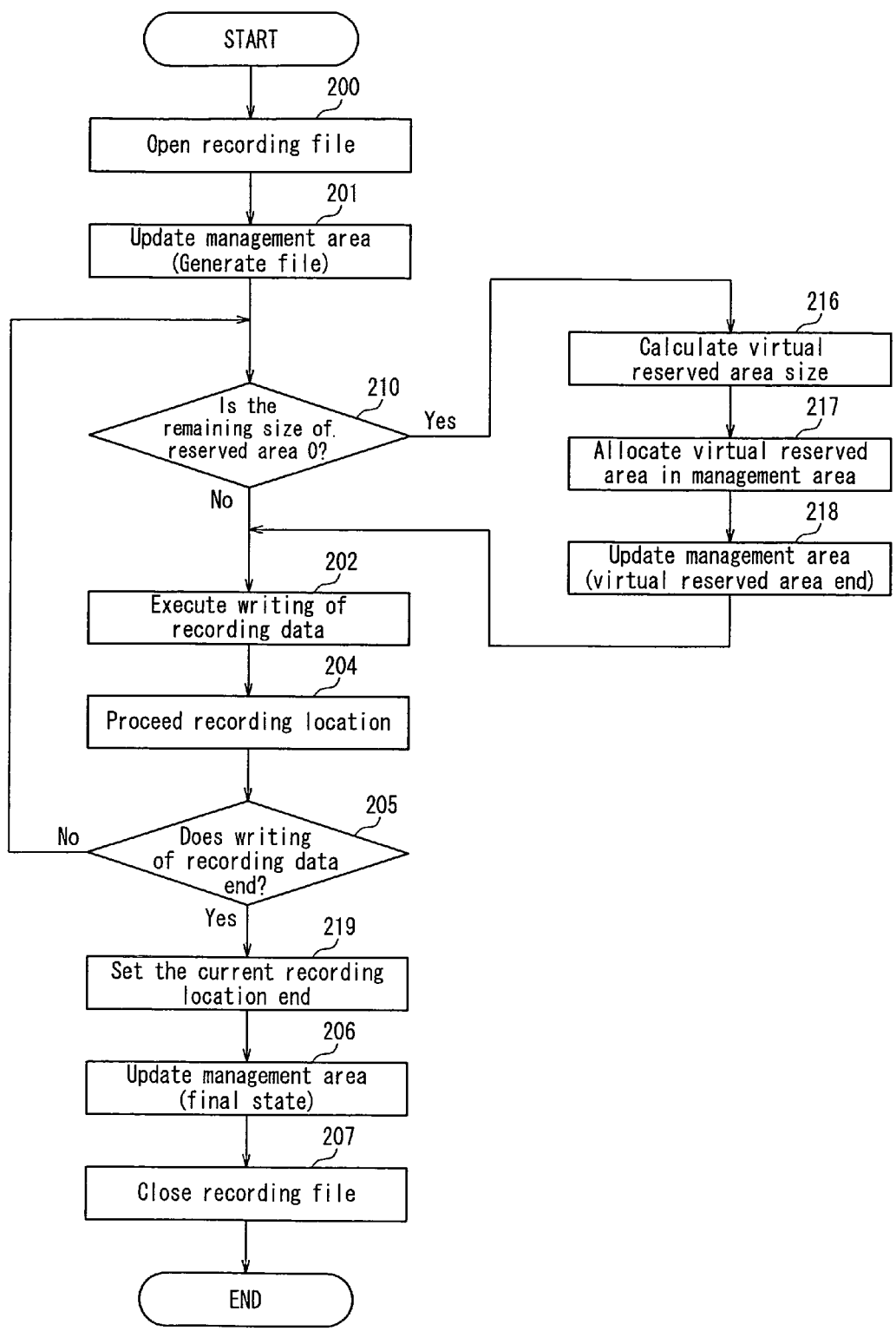
FIG. 11 is a flow chart showing a file recording process in Embodiment 4.
Figure 12:
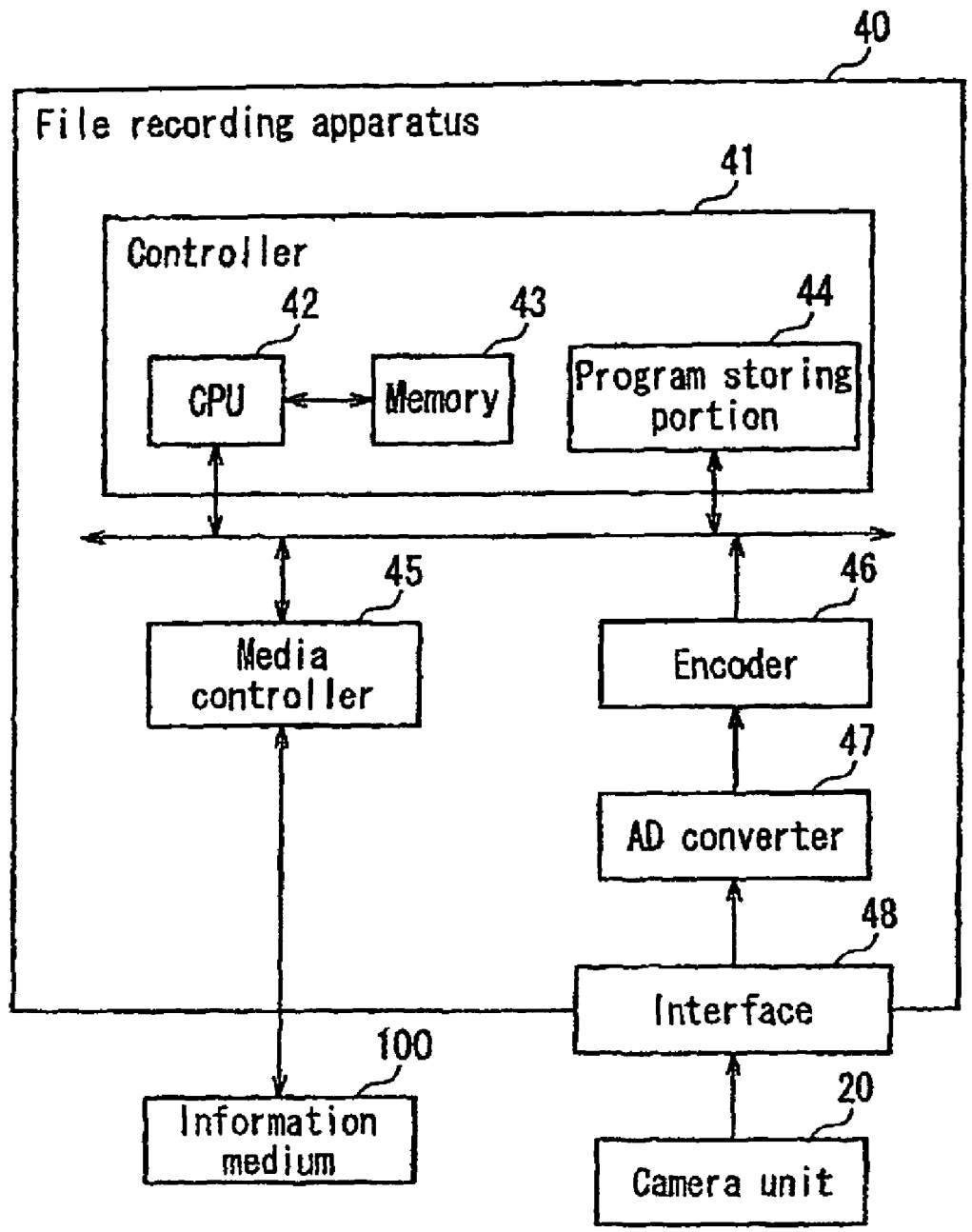
FIG. 12 is a block diagram showing a hardware configuration of a conventional file recording apparatus.
Figure 13:
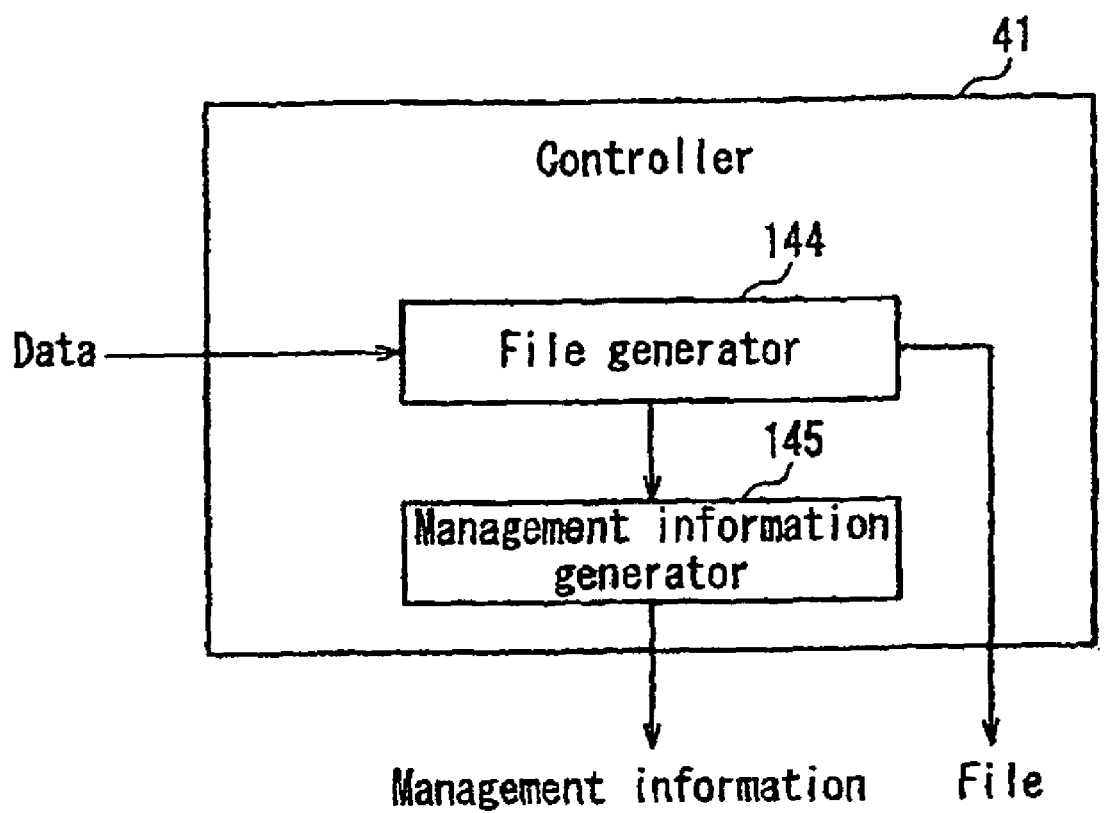
FIG. 13 is a block diagram showing a software configuration of a conventional file recording apparatus.
Figure 14:
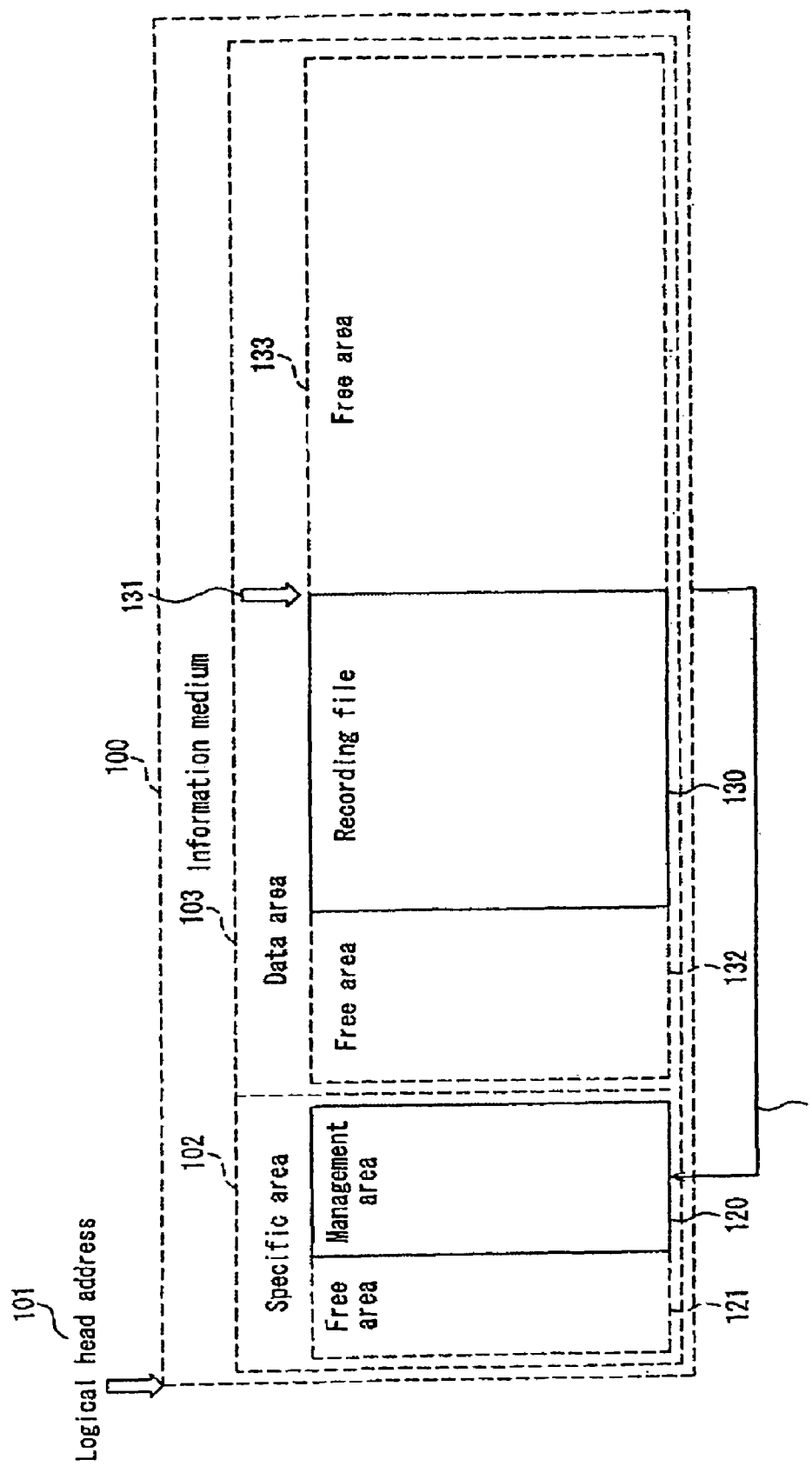
FIG. 14 is a schematic view showing a configuration of an information medium in a conventional file recording method.
Figure 15A:
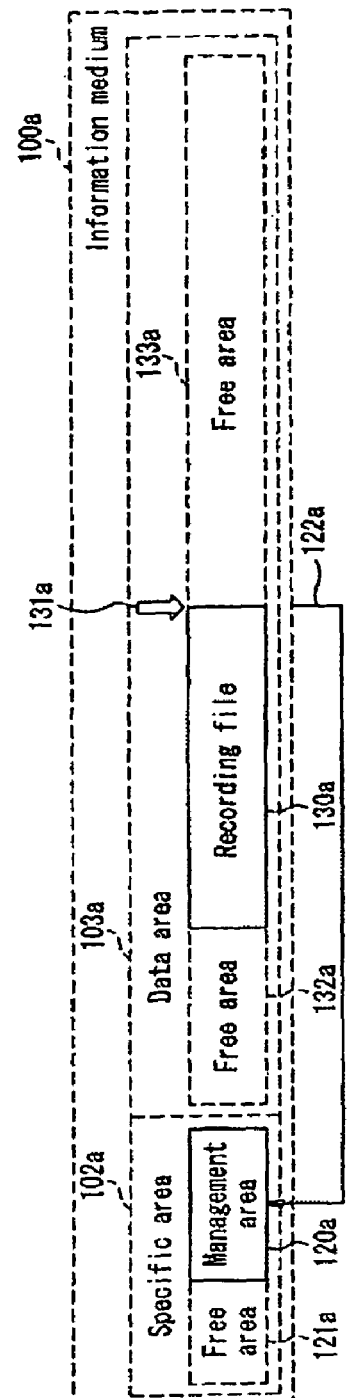
FIG. 15A is a diagram showing changes in contents of the information medium in a conventional file recording method.
Figure 15B:
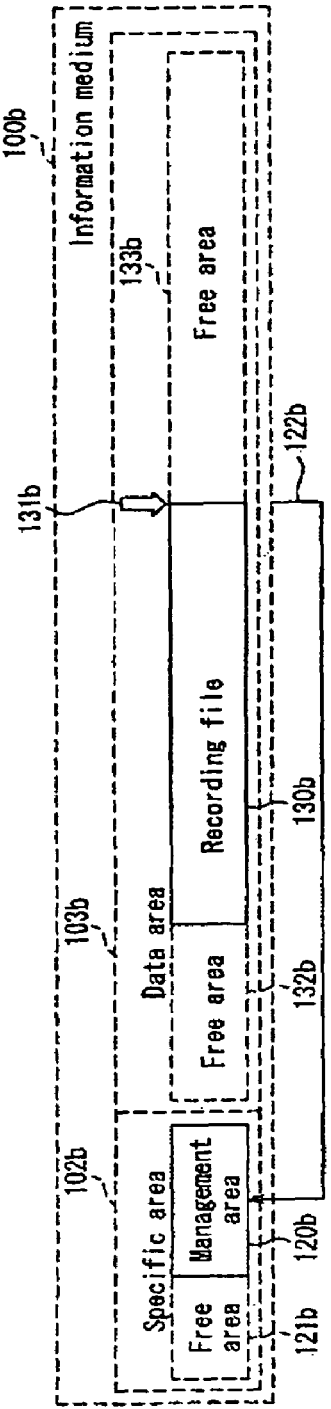
FIG. 15B is a diagram showing changes in contents of the information medium in the conventional file recording method.
Figure 15C:
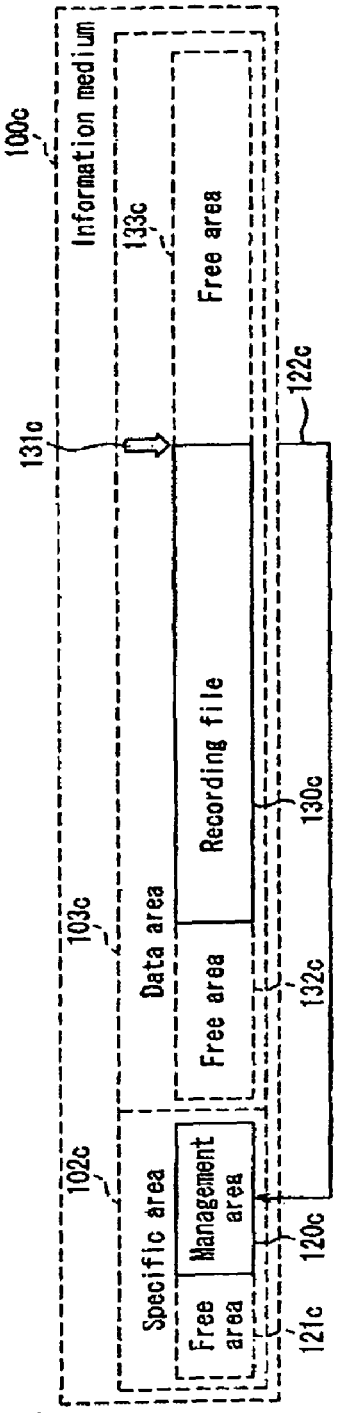
FIG. 15C is a diagram showing changes in contents of the information medium in the conventional file recording method.

FIG. 11 is a flow chart showing a file recording process procedure in Embodiment 4. The flow chart in FIG. 11 is different from the flow chart in FIG. 7 in the following points. In FIG. 11, steps 216 to 218 denote processes for a case where allocation of a new virtual reserved area is determined as necessary in the step 210. The step 216 is a process of calculating the size of the virtual reserved area to be newly allocated. The step 217 is a process of executing a truncate process and increasing the whole size of the recording file up to a location at which the thus calculated virtual reserved area size is added to the current location of the recording file. The step 218 is a process of updating the management area after allocating the new virtual reserved area.

The truncate function of the file system is set to increase only the whole size of the recording file in a case where a location behind the current location of the recording file is designated, while data for filling the increased area (for example, data entirely composed of '00' or data entirely composed of 'FF') will not be written.

The operations will be described below. The following description is focused on differences in comparison with any of Embodiments 1-3.

In the file recording apparatus 10, when data are recorded as a recording file 130 on the data area 103 of the information medium 100, the reserved area allocating portion 147 allocates on the management area 120 the size calculated by the size calculator 148. Specifically, in the step 217, the reserved area allocating portion 147 issues a truncate command and increases the file size at the location behind the current recording location 131 by the size of the virtual reserved area. At this time, since data are not written actually on the information medium 100, the current recording location 131 does not move. Moreover, since the file size is increased, the management information generator 145 updates the management area 120 in the step 218 so as to correspond to the size. Thereby, a virtual reserved area 136 of a predetermined size is allocated from the end of the recording file 130, i.e., from the current recording location 131.

In a case where data are recorded additionally on the recording file 130, when the recording location 131 of the recording file 130 moves (step 204 in FIG. 11) due to the additional recording of data by the file generator 144 (step 202 in FIG. 11), the virtual reserved area 136 of the recording file 130 is decreased by the size corresponding to the added data. However, the end location of the recording file 130 including the virtual reserved area 136 is kept constant, and any new virtual sector allocation with respect to the file 130 will not be generated. Therefore, there is no need of updating the management area 120.

Furthermore, in the case of additionally recording data on the recording file 130, the virtual reserved area 136 is used up and thus a deficiency occurs with respect to the size corresponding to the data to be additionally recorded (step 210 in FIG. 11). In this case, the reserved area allocating portion 147 allocates, on the management area 120, a size newly calculated by the size calculator 148 (steps 216, 217 and 218 in FIG. 11). Thereby, a virtual reserved area 136 is allocated newly at the end on the recording file 130.

As mentioned above, in the file recording method in Embodiment 4, a reserved area is allocated only virtually on the management area 120. Therefore, a process of allocating a reserved area by writing data actually on the recording file 130 of the data area 103 can be deleted.

Since the thus recorded file is completely the same as a file recorded by an ordinary access method due to the step 219, an existing file system can be used directly for accessing the thus recorded file. Therefore, the compatibility can be maintained.

The calculation of the size for allocating the virtual reserved area can be performed similarly to the calculation of size for allocating the reserved area in any of Embodiments 1-3.

According to the present invention, it is possible to avoid the concentration of rewriting of management information of a file system to a storage area so as to extend the life of an information medium. Moreover, since an ordinary method to access to the file system is used as a process of allocating a reserved area, an existing file system can be used directly. Therefore, the present invention can be used preferably for video recording apparatuses, audio recording apparatuses and the other data recording apparatuses that use optical disks, flash memories or the like as information media.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. A file recording method for recording management information and a file on an information medium,
    the information medium comprising at least a specific area capable of recording the management information and a data area capable of recording the file, the specific area being arranged in a concentrated manner at a specific portion of the information medium,
    the method comprising:
    allocating, at a part of the file, a reserved area of a predetermined size on which reservation data has been written and which is continuous from a current recording location of the file under recording on the data area;
    recording, in the specific area, management information of the file comprising the reserved area; and
    starting a recording at the recording location when additionally recording data on the file so as to record the data on the reserved area, during which the management information pertaining to the end location of the file is kept constant.

2. A file recording method for recording management information and a file on an information medium,
    the information medium comprising at least a specific area capable of recording the management information and a data area capable of recording the file, the specific area being arranged in a concentrated manner at a specific portion of the information medium,
    the method comprising:
    recording, in the specific area, the management information of the file under recording on the data area for a case where a reserved area of a predetermined size on which reservation data has been written and which is continuous from a current recording location is allocated at a part of the file, so that a virtual reserved area for the predetermined size continuous from the recording location is allocated; and
    recording data from the recording location with respect to the virtual reserved area when additionally recording data on the file, and recording the data on the virtual reserved area, during which the management information pertaining to the end location of the file is kept constant.

3. The file recording method according to claim 1, wherein a timing for allocating the reserved area is determined on the basis of at least one selected from the group consisting of a whole size of the file under recording, a size of a free area in the data area on the information medium, a size of a remaining area in the reserved area, a time from the start of recording of the file under recording, and a timing that the recording location of the file reaches at least one logical address boundary of the information medium.

4. The file recording method according to claim 2, wherein a timing for allocating the virtual reserved area is determined on the basis of at least one selected from the group consisting of a whole size of the file under recording, a size of a free area in the data area on the information medium, a size of a remaining area in the virtual reserved area, a time from the start of recording of the file under recording, and a timing that the recording location of the file reaches at least one logical address boundary of the information medium.

5. The file recording method according to claim 1, wherein the size for allocating the reserved area correlates to at least one selected from the group consisting of a whole size of the file under recording, a size of a remaining area in the reserved area, a time from the start of recording of the file under recording, a size of a free area in the data area on the information medium, at least one logical address boundary of the information medium, a name of the file, and a data bandwidth of the file.

6. The file recording method according to claim 2, wherein the size for allocating the virtual reserved area correlates to at least one selected from the group consisting of a whole size of the file under recording, a size of a remaining area in the virtual reserved area, a time from the start of recording of the file under recording, a size of a free area in the data area on the information medium, at least one logical address boundary of the information medium, a name of the file, and a data bandwidth of the file.

7. The file recording method according to claim 3, wherein the size for allocating the reserved area correlates to at least one selected from the group consisting of a whole size of the file under recording, a size of a remaining area in the reserved area, a time from the start of recording of the file under recording, a size of a free area in the data area on the information medium, at least one logical address boundary of the information medium, a name of the file, and a data bandwidth of the file.

8. The file recording method according to claim 4, wherein the size for allocating the virtual reserved area correlates to at least one selected from the group consisting of a whole size of the file under recording, a size of a remaining area in the virtual reserved area, a time from the start of recording of the file under recording, a size of a free area in the data area on the information medium, at least one logical address boundary of the information medium, a name of the file, and a data bandwidth of the file.

9. The file recording method according to claim 1, wherein the reserved area is deleted after ending the recording of the file.

10. The file recording method according to claim 2, wherein the virtual reserved area is deleted after ending the recording of the file.

11. A file recording apparatus for recording management information and a file on an information medium,
the information medium comprising at least a specific area capable of recording the management information and a data area capable of recording the file, the specific area being arranged in a concentrated manner at a specific portion of the information medium,
the file recording apparatus comprising:
a controller for generating the management information and the file from data inputted from an exterior, and
a record-controller for recording on the information medium the management information and the file outputted from the controller;
wherein the controller comprises:
a file generator for generating a file to be recorded in the data area of the information medium,
a management information generator for generating management information relating to the file generated at the file generator,
a reserved area allocating portion for recording, on the specific area, the management information and for allocating a reserved area on which reservation data has been written and which is formed of data continuous from a current recording location of the file, and
a size calculator for calculating a size of the reserved area to be allocated by the reserved area allocating portion;
wherein the management information pertaining to the end location of the file is kept constant during recording the data on the reserved area.

12. A file recording apparatus for recording management information and a file on an information medium,
the information medium comprising at least a specific area capable of recording the management information and a data area capable of recording the file, the specific area being arranged in a concentrated manner at a specific portion of the information medium,
the file recording apparatus comprising:
a controller for generating the management information and the file from data inputted from an exterior, and
a record-controller for recording on the information medium the management information and the file outputted from the controller;
wherein the controller comprises:
a file generator for generating a file to be recorded in the data area of the information medium,
a management information generator for generating management information relating to the file generated at the file generator,
a reserved area allocating portion for recording, on the specific area, the management information for a case where a reserved area on which reservation data has been written and which is in the file under recording on the data area of a predetermined size continuous from a current recording location is allocated at a part of the file, so that a virtual reserved area for the predetermined size continuous from the recording location is allocated, and
a size calculator for calculating a size of the virtual reserved area;
wherein the management information pertaining to the end location of the file is kept constant during recording the data on the virtual reserved area.

13. The file recording apparatus according to claim 11, wherein a timing for allocating the reserved area in the reserved area allocating portion is determined on the basis of at least one selected from the group consisting of a whole size of the file under recording, a size of a free area in the data area on the information medium, a size of a remaining area in the reserved area, a time from the start of recording of the file under recording, and a timing that the recording location of the file reaches at least one logical address boundary of the information medium.

14. The file recording apparatus according to claim 12, wherein a timing for allocating the virtual reserved area in the reserved area allocating portion is determined on the basis of at least one selected from the group consisting of a whole size of the file under recording, a size of a free area in the data area on the information medium, a size of a remaining area in the virtual reserved area, a time from the start of recording of the file under recording, and a timing that the recording location of the file reaches at least one logical address boundary of the information medium.

15. The file recording apparatus according to claim 11, wherein the size calculator calculates the size for allocating the reserved area on the basis of at least one selected from the group consisting of a whole size of the file under recording, a size of a remaining area in the reserved area, a time from the start of recording of the file under recording, a size of a free area in the data area on the information medium, at least one logical address boundary of the information medium, a name of the file, and a data bandwidth of the file.

16. The file recording apparatus according to claim 12, wherein the size calculator calculates the size for allocating the virtual reserved area on the basis of at least one selected from the group consisting of a whole size of the file under recording, a size of a remaining area in the virtual reserved area, a time from the start of recording of the file under recording, a size of a free area in the data area on the information medium, at least one logical address boundary of the information medium, a name of the file, and a data bandwidth of the file.

* * * * *